(12) United States Patent
Kwon et al.

(10) Patent No.: US 12,072,743 B2
(45) Date of Patent: Aug. 27, 2024

(54) ELECTRONIC DEVICE INCLUDING HINGE STRUCTURE

(71) Applicant: Samsung Electronics Co., Ltd., Gyeonggi-do (KR)

(72) Inventors: Hyoksoo Kwon, Gyeonggi-do (KR); Seog Bang, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 107 days.

(21) Appl. No.: 17/847,741

(22) Filed: Jun. 23, 2022

(65) Prior Publication Data

US 2022/0342457 A1     Oct. 27, 2022

Related U.S. Application Data

(63) Continuation of application No. PCT/KR2022/003814, filed on Mar. 18, 2022.

(30) Foreign Application Priority Data

Apr. 27, 2021    (KR) .......................... 10-2021-0054063

(51) Int. Cl.
    *G06F 1/16*        (2006.01)
    *H02J 7/00*        (2006.01)
    *H04R 1/10*        (2006.01)

(52) U.S. Cl.
    CPC .......... *G06F 1/1681* (2013.01); *H02J 7/0044* (2013.01); *H04R 1/1025* (2013.01)

(58) Field of Classification Search
    CPC ..... G06F 1/1681; H02J 7/0044; H04R 1/1025
    USPC ............................... 381/74, 312, 87, 335, 75
    See application file for complete search history.

(56) References Cited

U.S. PATENT DOCUMENTS

| 6,021,784 | A | 2/2000 | Yuhara |
| 10,206,474 | B2 | 2/2019 | Brzezinski et al. |
| 10,582,287 | B2 | 3/2020 | Song et al. |
| 10,827,812 | B2 | 11/2020 | Reh et al. |
| 2008/0013765 | A1 | 1/2008 | Nielsen et al. |
| 2009/0087011 | A1* | 4/2009 | Kang ............. H04M 1/03 381/387 |

(Continued)

FOREIGN PATENT DOCUMENTS

| CN | 212211341 U | 12/2020 |
| FR | 2776898 A1 | 10/1999 |

(Continued)

OTHER PUBLICATIONS

Extended European Search Report dated Jul. 5, 2024.

*Primary Examiner* — Thjuan K Addy
(74) *Attorney, Agent, or Firm* — Cha & Reiter, LLC

(57) ABSTRACT

An electronic device includes a first housing, a second housing including a cover, a hinge engaging portion, and a hinge protrusion, and a hinge structure configured to rotate the second housing relative to the first housing, the hinge structure including a first base facing the hinge engaging portion and a second base connected to the first base, and the second base includes a first contact surface contacting the hinge protrusion as the second housing transitions between the closing position and the intermediate position, and a second contact surface contacting the hinge protrusion while the second housing transitions between the intermediate position and the opening position.

20 Claims, 21 Drawing Sheets

(56) References Cited

U.S. PATENT DOCUMENTS

2009/0291719 A1\* 11/2009 Christensen ........ H04M 1/0216
455/575.3
2010/0113100 A1 5/2010 Harmon et al.
2020/0107102 A1 4/2020 Sang et al.

FOREIGN PATENT DOCUMENTS

| KR | 10-0296038 B1 | 5/2001 |
| KR | 10-2019-0115962 A | 10/2019 |
| KR | 20-0491932 Y1 | 6/2020 |
| WO | 03/095320 A1 | 11/2003 |
| WO | 2005/117637 A1 | 12/2005 |
| WO | 2011/072427 A1 | 6/2011 |

\* cited by examiner

ELECTRONIC DEVICE INCLUDING HINGE STRUCTURE

CROSS-REFERENCE TO RELATED APPLICATIONS

This application is a continuation of International Application No. PCT/KR2022/003814 designating the United States, filed on Mar. 18, 2022, in the Korean Intellectual Property Receiving Office and is based on and claims priority to Korean Patent Application No. 10-2021-0054063, filed on Apr. 27, 2021, in the Korean Intellectual Property Office, the disclosures of which are incorporated by reference herein in their entireties.

BACKGROUND

1. Field

The disclosure relates to an electronic device including a hinge structure.

2. Description of Related Art

An electronic device for storing an electronic appliance (e.g., a wearable device) to carry or charge the electronic appliance is being developed. For example, the electronic device for storing the electronic appliance may include a cover and a hinge structure, and the hinge structure may allow the cover to rotate about a hinge axis using the hinge structure.

SUMMARY

In accordance with an aspect of the disclosure, it is possible to provide an electronic device for implementing a desired motion of opening and closing housings.

According to an embodiment, an electronic device includes: a first housing, a second housing comprising a cover facing the first housing, the cover comprising a hinge engaging portion, the hinge engaging portion comprising a hinge protrusion; and a hinge structure hingedly coupling the first housing and the second housing, the second housing being rotatable relative to the first housing, the second housing being transitionable between a closing position and an opening position, the closing position at which the first housing and the second housing define a first angle, the closing position being at which the first housing and the second housing define a second angle, an intermediate position at which the first housing and the second housing define a third angle that is between the first angle and the second angle, the hinge structure comprises a first base and a second base, the first base facing the hinge engaging portion and a second base connected to the first base, the second base comprising a first contact surface contacting the hinge protrusion while the second housing transitions between the closing position and the intermediate position; and a second contact surface configured contacting the hinge protrusion while the second housing transitions between the intermediate position and the opening position.

According to an embodiment, an electronic device includes: a first housing, a second housing comprising a cover facing the first housing, a hinge engaging portion formed in the cover, and a pair of hinge protrusions formed in the hinge engaging portion; and a hinge structure positioned between the first housing and the second housing such that the first housing is rotatable relative to the second housing such that during rotation of the first housing relative to the second housing, the second housing passes through an intermediate position at which the first housing and the second housing define a third angle between a first angle and a second angle, between a closing position at which the first housing and the second housing define the first angle and an opening position at which the first housing and the second housing define the second angle, the hinge structure comprising a first base facing the hinge engaging portion and a pair of second bases connected to the first base, the pair of second bases each comprising a first contact surface configured to contact the hinge protrusion while the second housing transitions between the closing position and the intermediate position, and a second contact surface configured to contact the hinge protrusion while the second housing transitions between the intermediate position and the opening position.

According to an embodiment, an electronic device includes: a first housing comprising an outer case and a front case positioned in at least a portion of the outer case and having at least one cavity for receiving at least one wearable device; a second housing comprising a cover configured to face the outer case, a hinge engaging portion formed in the cover, and a hinge protrusion formed in the hinge engaging portion; and a hinge structure positioned between the first housing and the second housing such that the second housing is rotatable with respect to the first housing, such that during rotation of the first housing relative to the second housing, the second housing passes through an intermediate position at which the first housing and the second housing define a third angle between a first angle and a second angle, between a closing position at which the first housing and the second housing define the first angle and an opening position at which the first housing and the second housing define the second angle; the hinge structure comprising a first base facing the hinge engaging portion and a second base connected to the first base, the second base comprising: a first contact surface configured to contact the hinge protrusion while the second housing transitions between the closing position and the intermediate position; and a second contact surface configured to contact the hinge protrusion while the second housing transitions between the intermediate position and the opening position.

According to an aspect of the disclosure, it is possible to open and close housings semi-automatically without a free-stop and to suppress contamination thereof with a foreign substance (e.g., metal shavings) from the outside.

According to an aspect of the disclosure, it is possible to provide an electronic device having no effects on peripheral component(s) when opening and closing housings.

According to an aspect of the disclosure, it is possible to improve the opening and closing durability of housings.

According to an aspect of the disclosure, it is possible to reduce the number of components constituting an electronic device and to reduce the difficulty of designing and assembling the components.

The effects of the electronic device according to embodiments are not limited to the above-mentioned effects, and other unmentioned effects can be more clearly understood from the following description by one of ordinary skill in the art.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
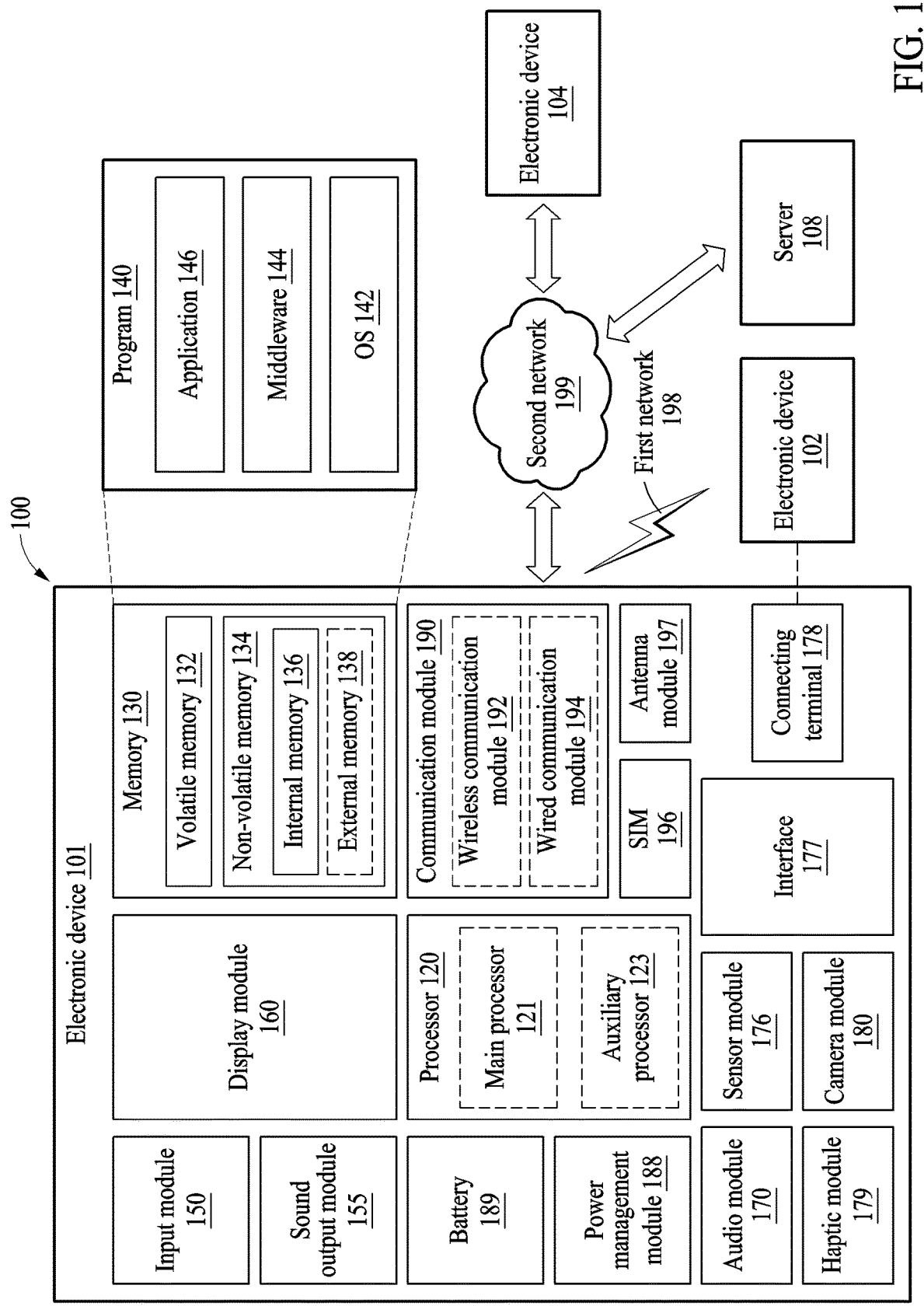
FIG. 1 is a block diagram of an electronic device in a network environment according to an embodiment.

Referring to FIG. 1, an electronic device 101 in a network environment 100 may communicate with an electronic device 102 via a first network 198 (e.g., a short-range wireless communication network), or communicate with at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the above components may be omitted from the electronic device 101, or one or more other components may be added in the electronic device 101. In an embodiment, some (e.g., the sensor module 176, the camera module 180, or the antenna module 197) of the components may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. According to an embodiment, as at least a part of data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment, the processor 120 may include a main processor 121 (e.g., a central processing unit (CPU) or an application processor (AP)) or an auxiliary processor 123 (e.g., a graphics processing unit (GPU), a neural processing unit (NPU), an image signal processor (ISP), a sensor hub processor, or a communication processor (CP)) that is operable independently of, or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is in an active state (e.g., executing an application). According to an embodiment, the auxiliary processor 123 (e.g., an ISP or a CP) may be implemented as a portion of another component (e.g., the camera module 180 or the communication module 190) that is functionally related to the auxiliary processor 123. According to an embodiment, the auxiliary processor 123 (e.g., an NPU) may include a hardware structure specified for artificial intelligence (AI) model processing. An AI model may be generated by machine learning. Such learning may be performed by, for example, the electronic device 101 in which an artificial intelligence model is executed, or performed via a separate server (e.g., the server 108). Learning algorithms may include, but are not limited to, for example, supervised learning, unsupervised learning, semi-supervised learning, or reinforcement learning. The artificial intelligence model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The AI model may additionally or alternatively include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory 134 may include an internal memory 136 and an external memory 138.

The program 140 may be stored as software in the memory 130, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing record. The receiver may be used to receive an incoming call. According to an embodiment, the receiver may be implemented separately from the speaker or as a part of the speaker.

The display module 160 may visually provide information to the outside (e.g., a user) of the electronic device 101. The display module 160 may include, for example, a control circuit for controlling a display, a hologram device, or a projector and control circuitry to control a corresponding one of the display, the hologram device, and the projector. According to an embodiment, the display device 160 may include a touch sensor adapted to sense a touch, or a pressure sensor adapted to measure an intensity of a force incurred by the touch.

The audio module 170 may convert a sound into an electric signal or vice versa. According to an embodiment, the audio module 170 may obtain the sound via the input module 150 or output the sound via the sound output device 155 or an external electronic device (e.g., an electronic device 102 such as a speaker or a headphone) directly or wirelessly connected to the electronic device 101.

The sensor module 176 may detect an operational state (e.g., power or temperature) of the electronic device 101 or an environmental state (e.g., a state of a user) external to the electronic device 101, and generate an electric signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electric signal into a mechanical stimulus (e.g., a vibration or a movement) or an electrical stimulus which may be recognized by a user via his or her tactile sensation or kinesthetic sensation. According to an embodiment, the haptic module 179 may include, for example, a motor, a piezoelectric element, or an electric stimulator.

The camera module 180 may capture a still image and moving images. According to an embodiment, the camera module 180 may include one or more lenses, image sensors, ISPs, or flashes.

The power management module 188 may manage power supplied to the electronic device 101. According to an embodiment, the power management module 188 may be implemented as, for example, at least a part of a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently of the processor 120 (e.g., an AP) and that support a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), an array antenna, analog beam-forming, or a large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or the power may be transmitted or received between the communication module 190 and the external electronic device via the at least one selected antenna. According to an embodiment, another component (e.g., a radio frequency integrated circuit (RFIC)) other than the radiating element may be additionally formed as a part of the antenna module 197.

According to an embodiment, the antenna module 197 may form a mmWave antenna module. According to an embodiment, the mmWave antenna module may include a PCB, an RFIC disposed on a first surface (e.g., a bottom surface) of the PCB or adjacent to the first surface and capable of supporting a designated a high-frequency band (e.g., the mmWave band), and a plurality of antennas (e.g., array antennas) disposed on a second surface (e.g., a top or a side surface) of the PCB, or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of the same type as or a different type from the electronic device 101. According to an embodiment, all or some of operations to be executed by the electronic device 101 may be executed at one or more of the external electronic devices 102, 104, and 108. For example, if the electronic device 101 needs to perform a function or a service automatically, or in response to a request from a user or another device, the electronic device 101, instead of, or in addition to, executing the function or the service, may request one or more external electronic devices to perform at least part of the function or the service. The one or more external electronic devices receiving the request may perform the at least part of the function or the service requested, or an additional function or an additional service related to the request, and may transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to an embodiment may be one of various types of electronic devices. The electronic device may include, for example, a portable communication device (e.g., a smartphone), a computer device, a portable multimedia device, a portable medical device, a camera, a wearable device, or a home appliance device. According to an embodiment of the disclosure, the electronic device is not limited to those described above.

It should be appreciated that various embodiments of the present disclosure and the terms used therein are not intended to limit the technological features set forth herein to particular embodiments and include various changes, equivalents, or replacements for a corresponding embodiment. In connection with the description of the drawings, like reference numerals may be used for similar or related components. It is to be understood that a singular form of a noun corresponding to an item may include one or more of the things, unless the relevant context clearly indicates otherwise. As used herein, "A or B", "at least one of A and B", "at least one of A or B", "A, B or C", "at least one of A, B and C", and "A, B, or C," each of which may include any one of the items listed together in the corresponding one of the phrases, or all possible combinations thereof. Terms such as "first", "second", or "first" or "second" may simply be used to distinguish the component from other components in question, and may refer to components in other aspects (e.g., importance or order) is not limited. It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2A:
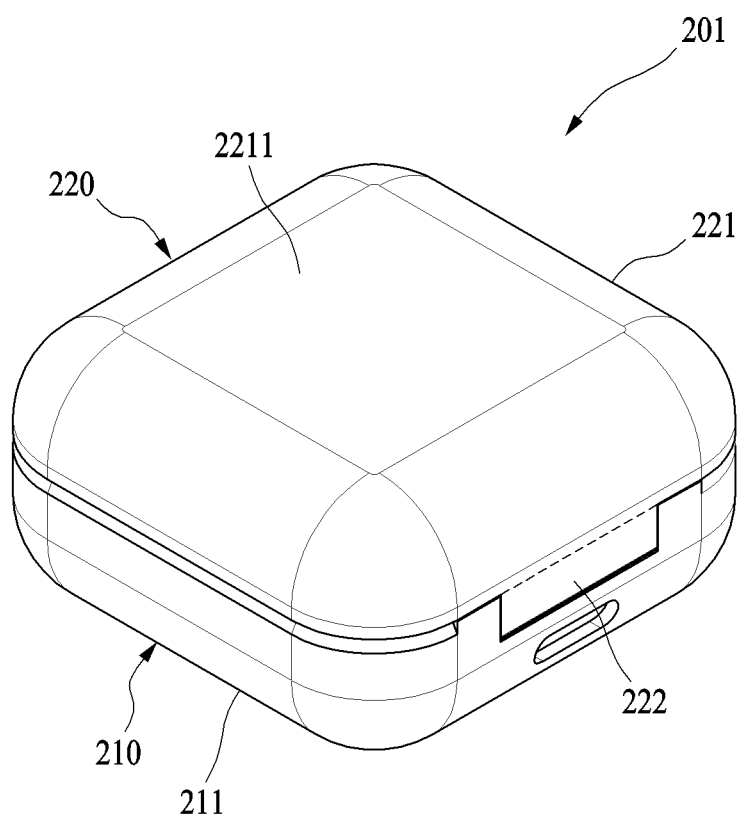
FIG. 2A is a perspective view of an electronic device that is folded according to an embodiment.
Figure 2A:
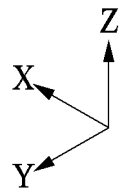
Figure 2B:
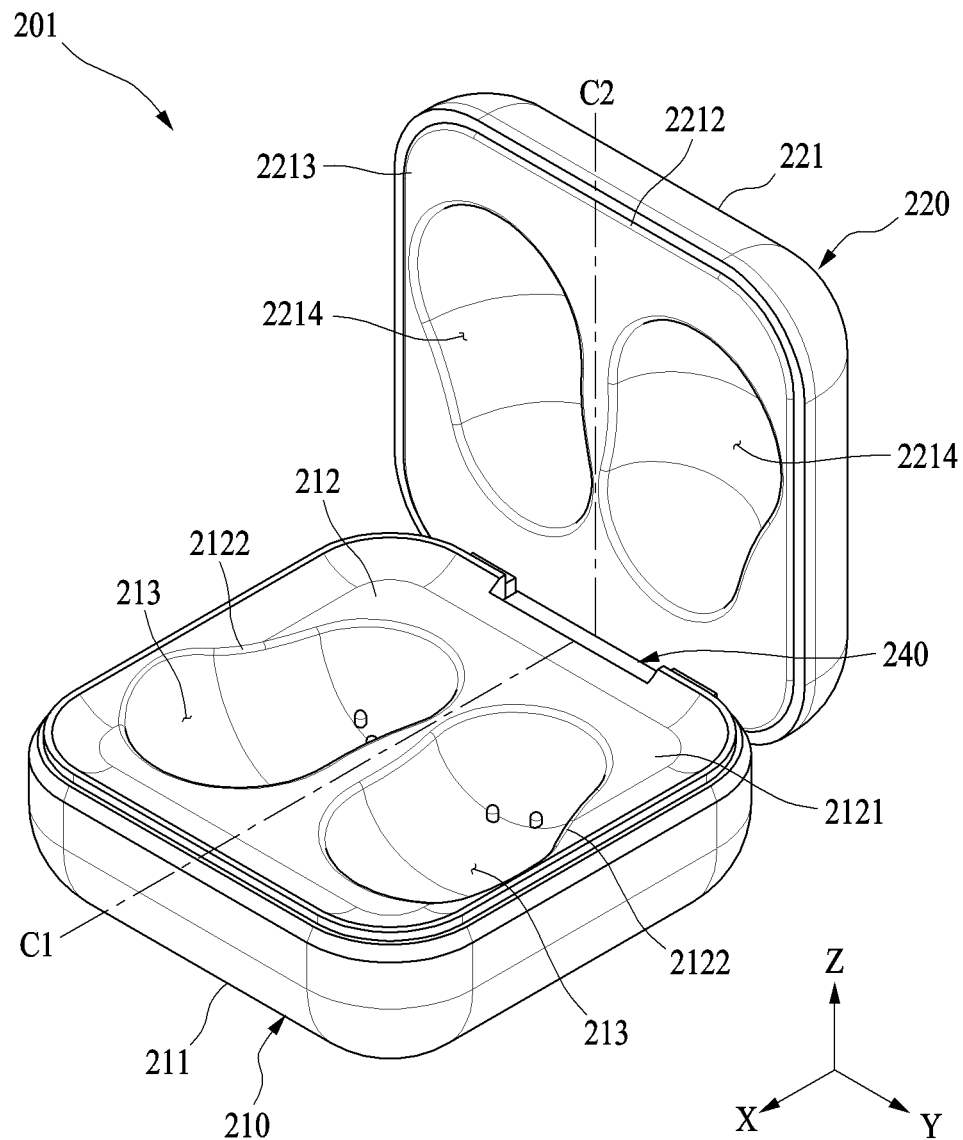
FIG. 2B is a perspective view of an electronic device that is unfolded according to an embodiments.
Figure 3A:
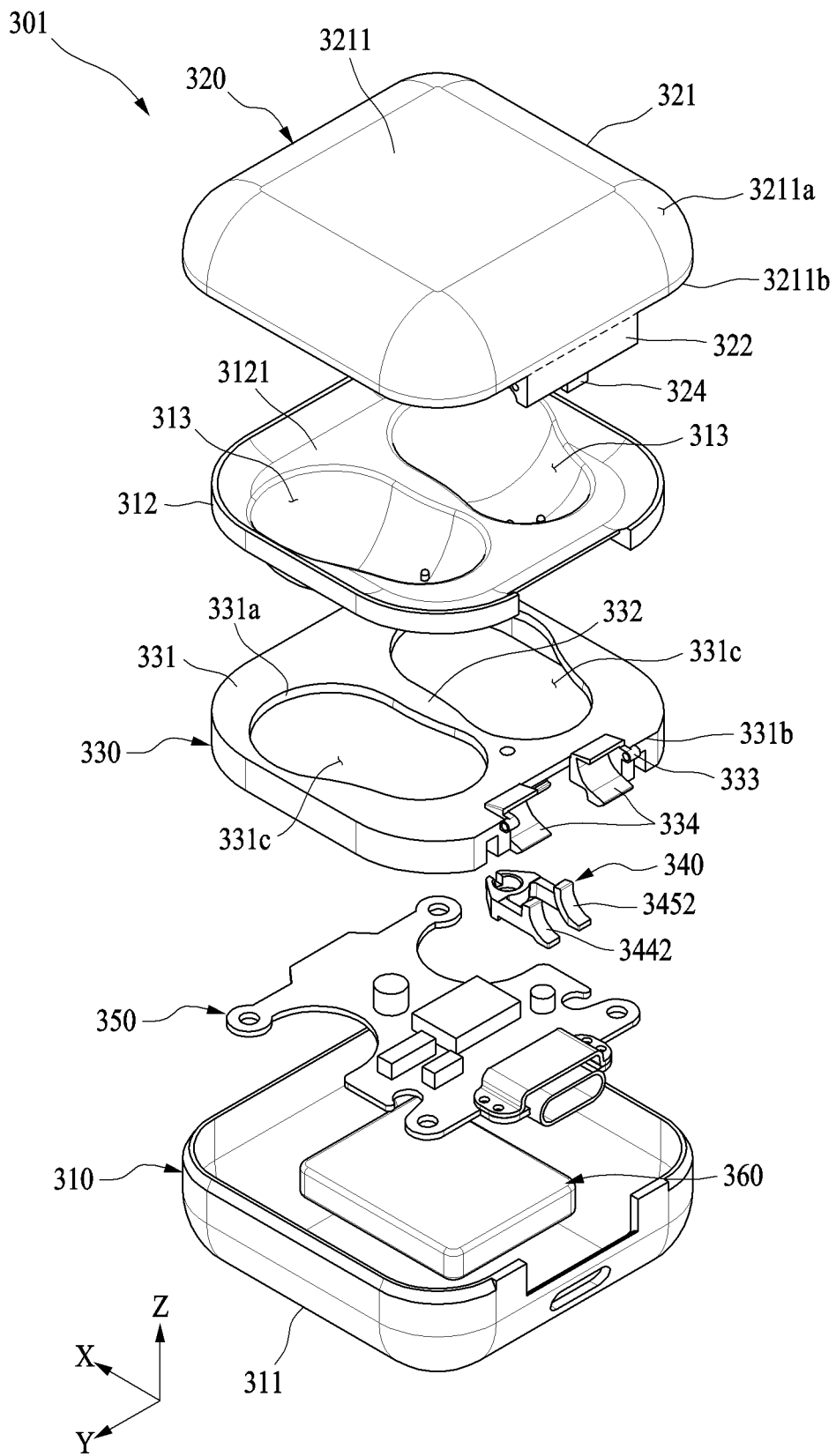
FIG. 3A is an exploded perspective view of an electronic device according to an embodiment.
Figure 3B:
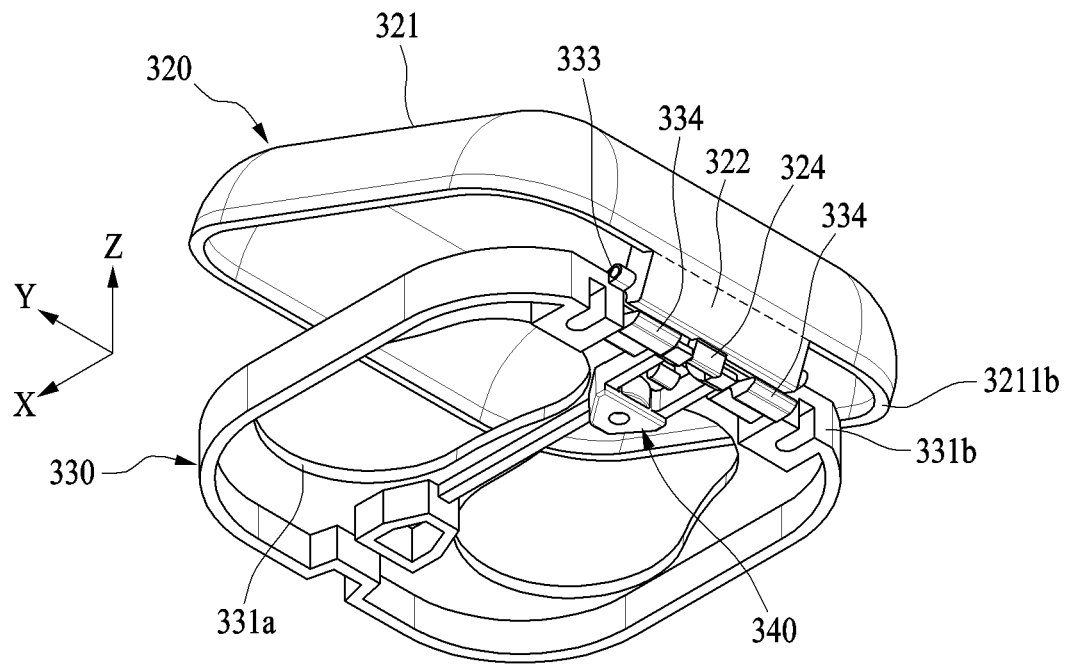
FIG. 3B is a perspective view of a portion of an electronic device including a hinge structure viewed in a first direction (e.g., an upward direction) according to an embodiment.
Figure 3C:
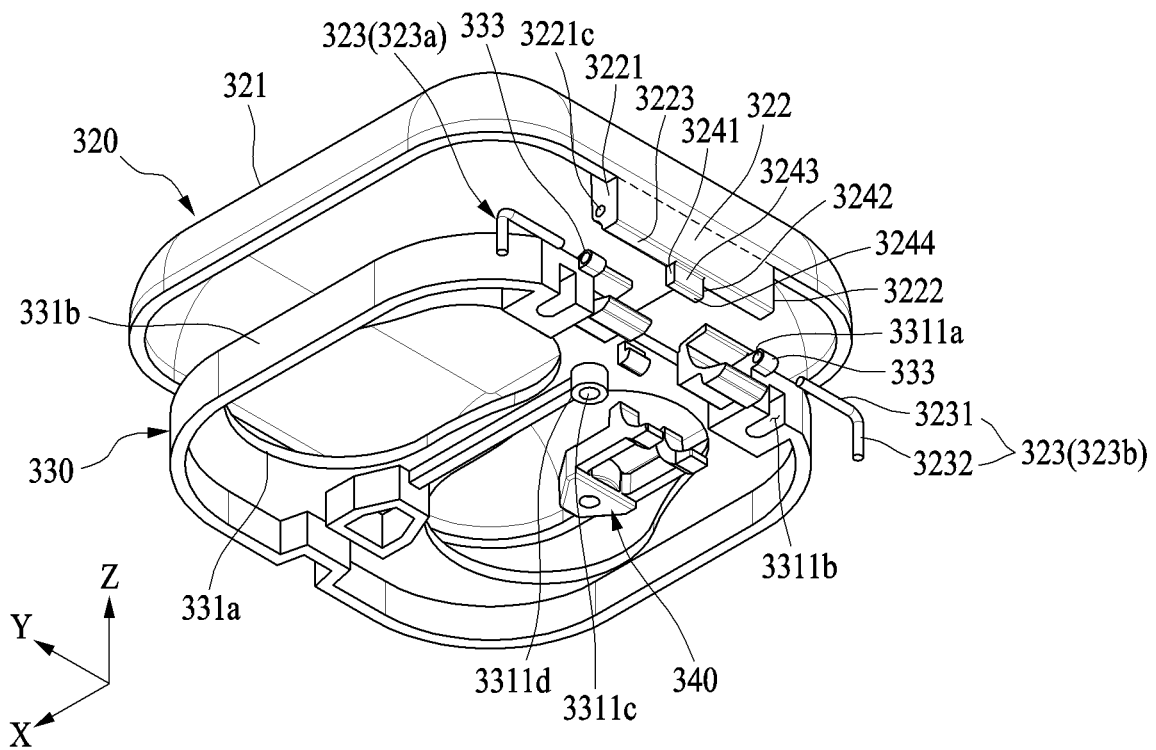
FIG. 3C is an exploded perspective view of the portion of the electronic device including the hinge structure of FIG. 3B.
Figure 3D:
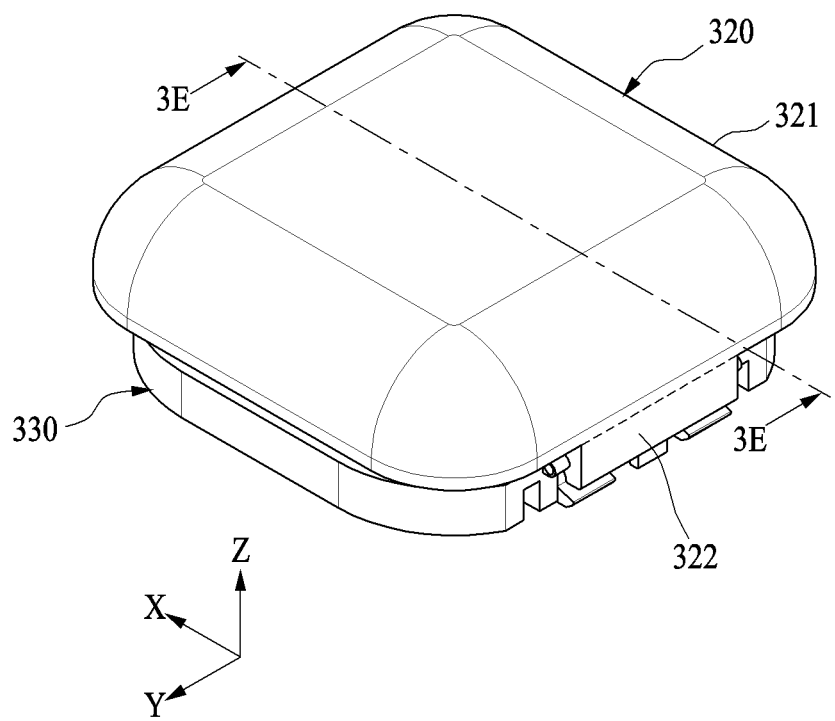
FIG. 3D is a perspective view of the portion of the electronic device including the hinge structure of FIG. 3B viewed in a second direction (e.g., a lateral direction)
Figure 3E:
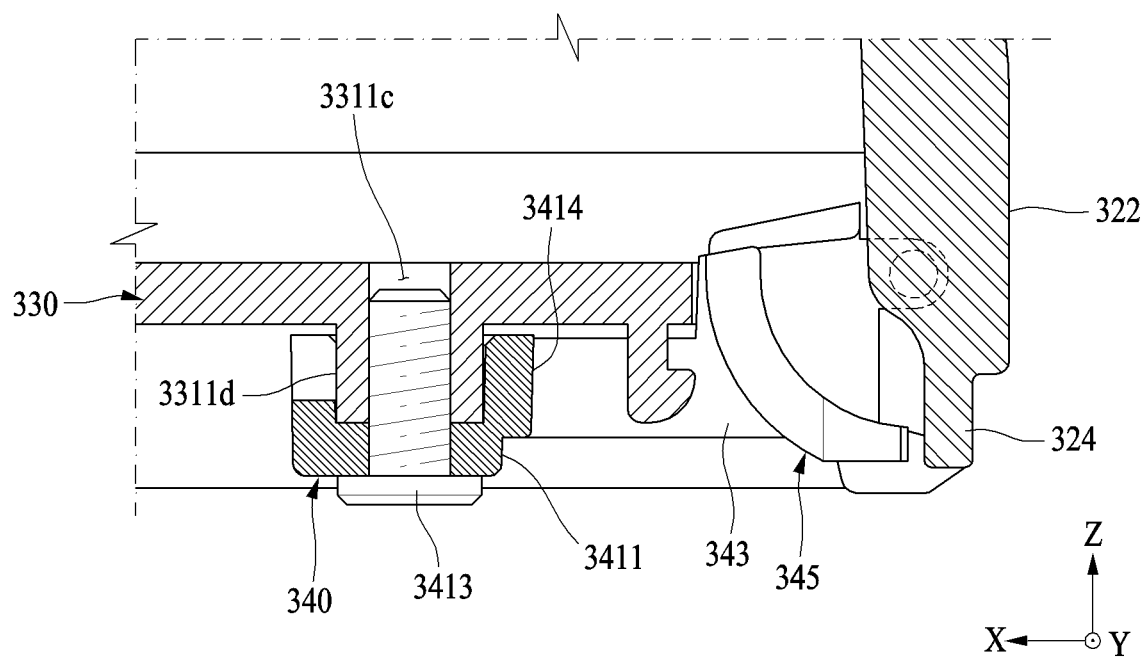
FIG. 3E is a cross-sectional view of the electronic device of FIG. 3D viewed along 3E-3E.
Figure 3F:
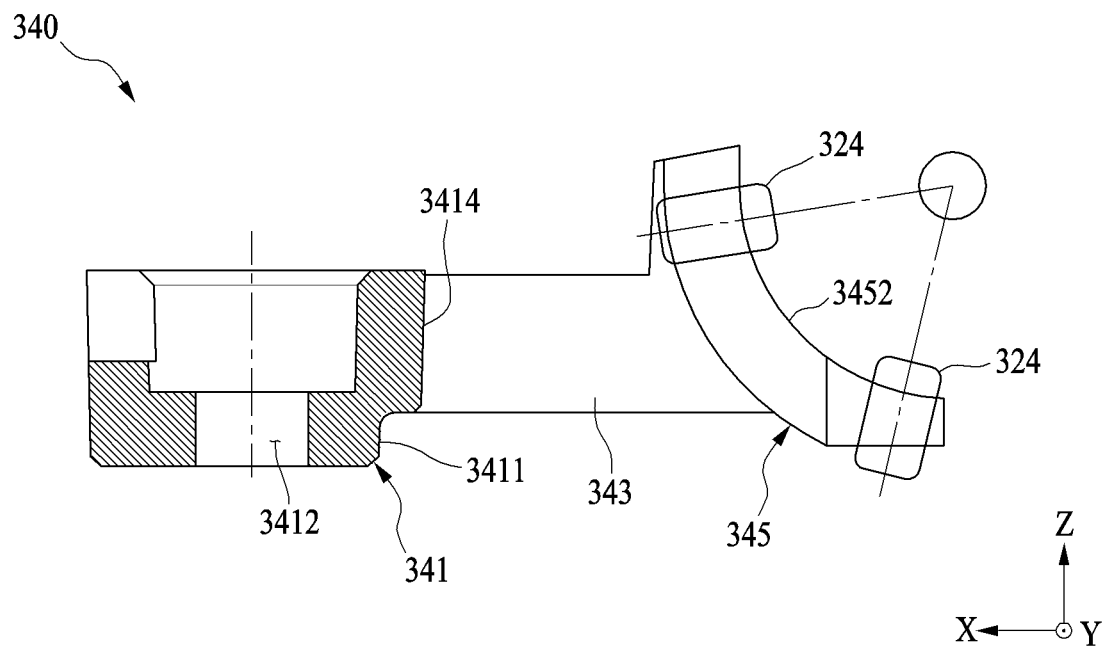
FIG. 3F is a view illustrating an interaction between the hinge structure and a hinge protrusion in the electronic device of FIG. 3E.
Figure 3G:
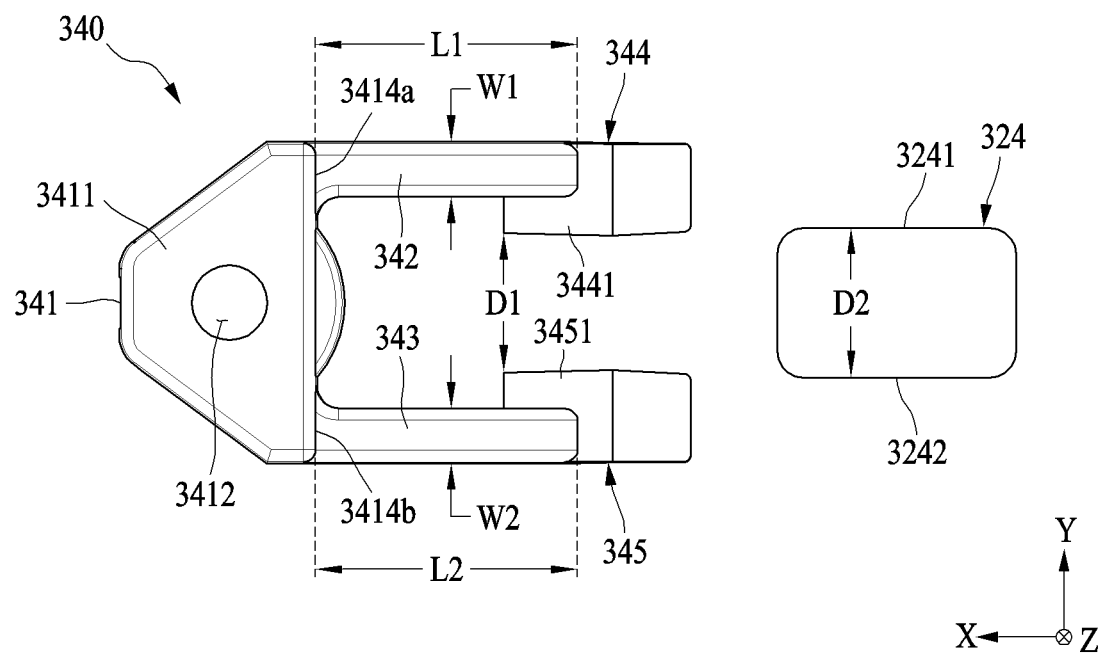
FIG. 3G is a view illustrating the hinge structure and the hinge protrusion of the electronic device of FIG. 3E.

Referring to FIGS. 2A and 2B, an electronic device 201 (e.g., the electronic device 101) according to an embodiment may include a first housing 210 having a pair of cavities 213 configured to receive an electronic appliance (e.g., a pair of wearable devices to be worn on ears of a user). In an embodiment, the pair of cavities 213 may be positioned adjacent to each other on both sides from a first imaginary centerline C1 of the first housing 210. The shape and size of the pair of cavities 213 may correspond to the shape and size of the pair of wearable devices. The pair of cavities 213 are not limited in shape, type, and/or number, and the electronic device 201 depicted in the accompanying drawings, and may include various shapes, types, and/or numbers of cavities according to the shape, type, and/or number of electronic appliances. The first housing 210 may include an outer case 211 and a front case 212, and the pair of cavities 213 may be formed in the front case 212. The front case 212 may include a top surface 2121 that defines boundaries 2122 of the pair of cavities 213 and that may be exposed to an outside of the electronic device 201.

The electronic device 201 may include a second housing 220 connected to the first housing 210. The second housing 220 may be rotatably connected to the first housing 210. The second housing 220 may transition between a closing position (see FIG. 2A) at which the second housing 220 is disposed above a pair of wearable devices respectively received in the pair of cavities 213 of the first housing 210 to define a first angle (e.g., about 0 degrees))(° with respect to the first housing 210 and an opening position (see FIG. 2B) at which the second housing 220 forms a second angle (e.g., about 95° to about 100°) with respect to the first housing 210 such that the pair of wearable devices are taken out of or put in the pair of cavities 213. While transitioning from the closing position to the opening position or from the opening position to the closing position, the second housing 220 may pass through an intermediate position at which the second housing 220 forms a third angle (e.g., about 30° or about 60°) with respect to the first housing 210, the third angle being between the first angle and the second angle. In an embodiment, the second housing 220 may remain substantially at the intermediate position at which the second housing 220 forms the third angle with respect to the first housing 210.

In an embodiment, the second housing 220 may include a cover 221 and a hinge engaging portion 222. The cover 221 may include an outer cover 2211 forming an exterior and a cover bracket 2212 having a facing surface 2213 facing the top surface 2121 of the front case 212. The cover bracket 2212 may include a pair of recesses 2214 for receiving at least a portion of the pair of wearable devices when the pair of wearable devices are respectively received in the pair of cavities 213, and the pair of recesses 2114 may have a shape corresponding to the shape of at least a portion of the pair of wearable devices. The pair of recesses 2214 may be positioned adjacent to each other on both sides from a second imaginary centerline C2 that intersects with the first imaginary centerline C1. The shape and size of the pair of recesses 2214 may correspond to the shape and size of at least a portion of the pair of wearable devices. The pair of recesses 2214 are not limited in shape, type, and/or number, and the cover bracket 2212 and may include various shapes, types, and/or numbers of recesses according to the shape, type, and/or number of electronic appliances other than those illustrated in the accompanying drawings.

In an embodiment, the electronic device 201 may include a hinge structure 240 that may semi-automatically rotate without a free-stop that the second housing 220 may stop at any desired angle with respect to the first housing 210. In another embodiment, the electronic device 201 may include a hinge structure 240 for implementing a free-stop that the second housing 220 may stop at any desired angle with respect to the first housing 210.

Referring to FIGS. 3A to 3G, an electronic device 301 (e.g., the electronic device 201) according to an embodiment may include a first housing 310 (e.g., the first housing 210) including an outer case 311 (e.g., the outer case 211) and a front case 312 (e.g., the front case 212), a second housing 320 (e.g., the second housing 220), a support body 330, a hinge structure 340, a printed circuit board (PCB) 350, and an energy storage and charging module 360. The front case 312, the support body 330, the hinge structure 340, the PCB 350, and the energy storage and charging module 360 may be positioned between the first housing 310 and the second housing 320. In an embodiment, the front case 312, the support body 330, the hinge structure 340 (e.g., the hinge structure 240), the PCB 350, and the energy storage and charging module 360 may be arranged sequentially (e.g., in a direction from the second housing 320 toward the first housing 310) between the first housing 310 and the second housing 320.

The second housing 320 may include a cover 321 (e.g., the cover 221) and a hinge engaging portion 322 (e.g., the hinge engaging portion 222). The cover 321 may include an outer cover 3211 (e.g., the outer cover 2211) forming an exterior and a cover bracket (e.g., the cover bracket 2212) having a facing surface (e.g., the facing surface 2213) facing a top surface 3121 (e., the top surface 2121) of the front case 312. The outer cover 3211 may include an outer surface 3211a and an outer edge 3211b by which the outer surface 3211a is bounded. In an embodiment, the outer cover 3211 may have a dome shape. The hinge engaging portion 322 may be formed on at least a portion (e.g., a rear edge portion) of the outer edge 3211b of the outer cover 3211. The hinge engaging portion 322 may extend from at least a portion of the outer edge 3211b in one direction (e.g., −Z direction).

The second housing 320 may include at least one hinge shaft 323 that is rotatably connected to the support body 330 and acts as a center of rotation with respect to the first housing 310. In an embodiment, the hinge shaft 323 may be coupled to a hole 3221c formed in a first surface 3221 (e.g., a first side surface) of the hinge engaging portion 322. In an embodiment, the hinge shaft 323 may include a first shaft extension 3231 that extends in a first direction, and a second shaft extension 3232 connected to the first shaft extension 3231 and extending in a second direction intersecting with the first direction. The first shaft extension 3231 may be coupled to the hole 3221c and rotatably coupled to a shaft hole 3311a formed in a portion of the support body 330. At least a portion of the second shaft extension 3232 may be received in a shaft recess 3311b formed in a portion of the support body 330. In an embodiment, the second housing 320 may include a first hinge shaft 323a that is coupled to the first surface 3221 (e.g., the first side surface) of the hinge engaging portion 322 and a second hinge shaft 323b that is coupled to a second surface 3222 (e.g., a second side surface) on an opposite side of the first surface 3221 of the hinge engaging portion 322.

The second housing 320 may include a hinge protrusion 324 that is configured to engage with the hinge structure 340. In an embodiment, the hinge protrusion 324 may have a shape of a projection that protrudes from at least a portion of a third surface 3223 (e.g., a bottom surface) of the hinge engaging portion 322. The hinge protrusion 324 may have a first outer surface 3241 (e.g., a first side surface), a second outer surface 3242 (e.g., a second side surface) on an opposite side of the first outer surface 3241, a plurality of third outer surfaces 3243 (e.g., third side surfaces) between the first outer surface 3241 and the second outer surface 3242, and a fourth outer surface 3244 (e.g., a bottom surface) connected to the first outer surface 3241, the second outer surface 3242, and the plurality of third outer surfaces 3243.

The support body 330 may fix the hinge structure 340 and may support the front case 312. The support body 330 may include a main rim 331 having an inner edge 331a and an outer edge 331b. In an embodiment, the inner edge 331a of the main rim 331 may receive at least a portion of the pair of wearable devices and define a pair of inner spaces 331c corresponding to a pair of cavities 313 (e.g., the cavities 213) of the front case 312. In an embodiment, the support body 330 may include a separation rim 332 for separating the pair of inner spaces 331c. At least a portion of the hinge structure 340 may be fixed to at least a partial area (e.g., a partial area of a bottom surface) of the main rim 331 or the separation rim 332. For example, a first fixing hole 3311c for fixing the hinge structure 340 may be formed on one surface (e.g., the bottom surface) of the main rim 331. In an embodiment, the main rim 331 may include a first fixing hole 3311c and a protruding rib 3311d protruding from one surface (e.g., the bottom surface).

The support body 330 may include a hinge coupler 333 to which at least one hinge shaft 323 is rotatably connected. The hinge coupler 333 may be positioned on the outer edge 331b of the main rim 331. In an embodiment where a plurality of hinge shafts 323 are provided, the support body 330 may include a plurality of hinge couplers 333 to which the plurality of hinge shafts 323 are rotatably connected, and the plurality of hinge couplers 333 may be spaced apart from each other along the outer edge 331b of the main rim 331.

The support body 330 may include at least one hinge slide 334 that guides at least a portion of the third surface 3223 (e.g., the bottom surface) of the hinge engaging portion 322. For example, the hinge slide 334 may guide a portion of the hinge engaging portion 322 in which the hinge protrusion 324 is not formed. The hinge slide 334 may be positioned at the outer edge 331b of the main rim 331 and close to the hinge coupler 333. For example, the hinge slide 334 may be positioned close to the hinge coupler 333 so as to be positioned below the first shaft extension 3231 of the hinge shaft 323. In an embodiment, the support body 330 may include a plurality of hinge slides 334. The plurality of hinge slides 334 may be spaced apart from each other along the outer edge 331b of the main rim 331.

The hinge structure 340 may be configured to stop the second housing 320 with respect to the first housing 310 at a predetermined rotation position. In other words, the hinge structure 340 may implement a free-stop of the second housing 320 with respect to the first housing 310. In an embodiment, the hinge structure 340 may include a hinge fixing portion 341, a first extension 342, a second extension 343, a first elastic portion 344, and a second elastic portion 345.

The hinge fixing portion 341 may be fixed to the support body 330. In an embodiment, the hinge fixing portion 341 may include a base 3411, a second fixing hole 3412 formed in the base 3411 to correspond to the first fixing hole 3311c, and a fastening member 3413 fastened to the first fixing hole 3311c and the second fixing hole 3412. The fastening member 3413 may include, for example, a screw, a hook, and/or other fastening means. In an embodiment, the hinge fixing portion 341 may include a flange 3414 formed in the base 3411 to receive at least a portion of the protruding rib 3311d.

The first extension 342 may extend from the hinge fixing portion 341 in one direction (e.g., −X direction) and connect the hinge fixing portion 341 and the first elastic portion 344. The second extension 343 may extend from the hinge fixing portion 341 in one direction (e.g., −X direction) and connect the hinge fixing portion 341 and the second elastic portion 345. In an embodiment, the first extension 342 may extend from a first portion 3414a of the flange 3414, and the second extension 343 may extend from a second portion to 3414b that is spaced apart from the first portion 3414a of the flange 3414. In an embodiment, the first extension 342 and the second extension 343 may extend parallel to each other. In an embodiment, an extension length L1 of the first extension 342 and an extension length L2 of the second extension 343 may be substantially the same. In an embodiment, a width W1 of the first extension 342 and a width W2 of the second extension 343 may be substantially the same. In an embodiment, the first extension 342 and the second extension 343 may be bent in a width direction (e.g., −Y/+Y direction). In an embodiment, at least a portion of the first extension 342 and the second extension 343 may be formed of an elastic material (e.g., plastic).

The first elastic portion 344 and the second elastic portion 345 may be configured to elastically deform. The first elastic portion 344 may be in frictional contact with the first outer surface 3241 (e.g., the first side surface) of the hinge protrusion 324. The second elastic portion 345 may be in frictional contact with the second outer surface 3242 (e.g., the second side surface) of the hinge protrusion 324.

In an embodiment, a distance D1 between the first elastic portion 344 and the second elastic portion 345 may be less than a distance D2 between the first outer surface 3241 and the second outer surface 3242 of the hinge protrusion 324. This may also be construed as that the hinge protrusion 324 is inserted between the first elastic portion 344 and the second elastic portion 345 in an interference fit manner.

When the hinge protrusion 324 is inserted between the first elastic portion 344 and the second elastic portion 345, a restoring force may be generated in the first elastic portion 344 in a direction (e.g., −Y direction) to press the first outer surface 3241 of the hinge protrusion 324, a restoring force may be generated in the second elastic portion 345 in a direction (e.g., +Y direction) to press the second outer surface 3242 of the hinge protrusion 324, and a frictional force may be generated between the first elastic portion 344 and the first outer surface 3241 of the hinge protrusion 324 and between the second elastic portion 345 and the second outer surface 3242 of the hinge protrusion 324, respectively.

When the second housing 320 is rotated with respect to the first housing 310 by a motion of a user between a first rotation position (e.g., at which the angle between the first housing 310 and the second housing 320 is about 0°) and a second rotation position (e.g., at which the angle between the first housing 310 and the second housing 320 is about 100°), the user may feel a force to suppress or delay the rotation of the second housing 320 with respect to the first housing 310, and it is possible to implement a free-stop for stopping the second housing 320 with respect to the first housing 310 at a predetermined rotation position.

Meanwhile, the frictional force between the first elastic portion 344 and the first outer surface 3241 of the hinge protrusion 324, the frictional force between the second elastic portion 345 and the second outer surface 3242 of the hinge protrusion 324, and the restoring force of the first elastic portion 344, and/or the restoring force of the second elastic portion 345 may depend on the width W1 of the first extension 342 and/or the width W2 of the second extension 343, the extension length L1 of the first extension 342 and/or the extension length L2 of the second extension 343, and/or a difference (D1−D2) between the distance between the first elastic portion 344 and the second elastic portion 345 and the distance D2 between the first outer surface 3241 and the second outer surface 3242 of the hinge protrusion 324, and by adjusting such parameters, it is possible to adjust the force to suppress and delay the rotation of the second housing 320 with respect to the first housing 310.

In an embodiment, at least a portion of the first elastic portion 344 and the second elastic portion 345 may be formed of an elastic material (e.g., plastic).

In an embodiment, the first elastic portion 344 may be in direct contact with the first outer surface 3241 of the hinge protrusion 324, and the second elastic portion 345 may be in direct contact with the second outer surface 3242 of the hinge protrusion 324. In another embodiment, the hinge structure 340 may include a lubricative layer (e.g., a grease layer) between the first elastic portion 344 and the first outer surface 3241 of the hinge protrusion 324 and/or between the second elastic portion 345 and the second outer surface 3242 of the hinge protrusion 324.

In an embodiment, the first elastic portion 344 may include a first protruding portion 3441 protruding in a direction (e.g., −Y direction) intersecting with the extension direction (e.g., −X direction) of the first extension 342 and in frictional contact with the first outer surface 3241 of the hinge protrusion 324, and the second elastic portion 345 may include a second protruding portion 3451 protruding in a direction (e.g., +Y direction) intersecting with the extension direction (e.g., −X direction) of the second extension 343 and in frictional contact with the second outer surface 3242 of the hinge protrusion 324. In an embodiment, the first protruding portion 3441 may protrude from one surface (e.g., an inner side surface) of the first extension 342 in a direction toward the first outer surface 3241 of the hinge protrusion 324, and the second protruding portion 3451 may protrude from one surface (e.g., an inner side surface) of the second extension 343 in a direction toward the second outer surface 3242 of the hinge protrusion 324. In some embodiments, the first protruding portion 3441 may not substantially protrude from the other surface (e.g., an outer side surface) of the first extension 342, and the second protruding portion 3451 may not substantially protrude from the other surface (e.g., an outer side surface) of the second extension 343.

In an embodiment, the first elastic portion 344 and the second elastic portion 345 may include guide portions 3442 and 3452 (see FIG. 3A) for guiding at least a portion of the hinge engaging portion 322, respectively. In an embodiment, each of the guide portions 3442 and 3452 may guide a portion of the hinge engaging portion 322 in which the hinge protrusion 324 is not formed. In an embodiment, each of the guide portions 3442 and 3452 may include a curved surface having a profile corresponding to a rotation trajectory of the second housing 320 about the hinge shaft 323.

In an embodiment, the hinge fixing portion 341, the first extension 342, the second extension 343, the first elastic portion 344, and the second elastic portion 345 may be seamlessly integrally formed.

In an embodiment (not shown), the hinge structure 340 may not include the first extension 342 and the second extension 343, and the first elastic portion 344 and the second elastic portion 345 may be directly connected to the hinge fixing portion 341.

The PCB 350 may include, for example, at least one of a processor (e.g., the processor 120), a memory (e.g., the memory 130), an input module (e.g., the input module 150), a sound output module (e.g., the sound output module 155), a display module (e.g., the display module 160), an audio module (e.g., the audio module 170), a sensor module (e.g., the sensor module 176), an interface (e.g., the interface 177), a connecting terminal (e.g., the connecting terminal 178), a power management module (e.g., the power management module 188), a communication module (e.g., the communication module 190), a SIM (e.g., the SIM 196), and/or an antenna module (e.g., the antenna module 197).

The energy storage and charging module 360 may include, for example, a battery (e.g., the battery 189) and a coil for charging and/or discharging the battery.

Figure 4A:
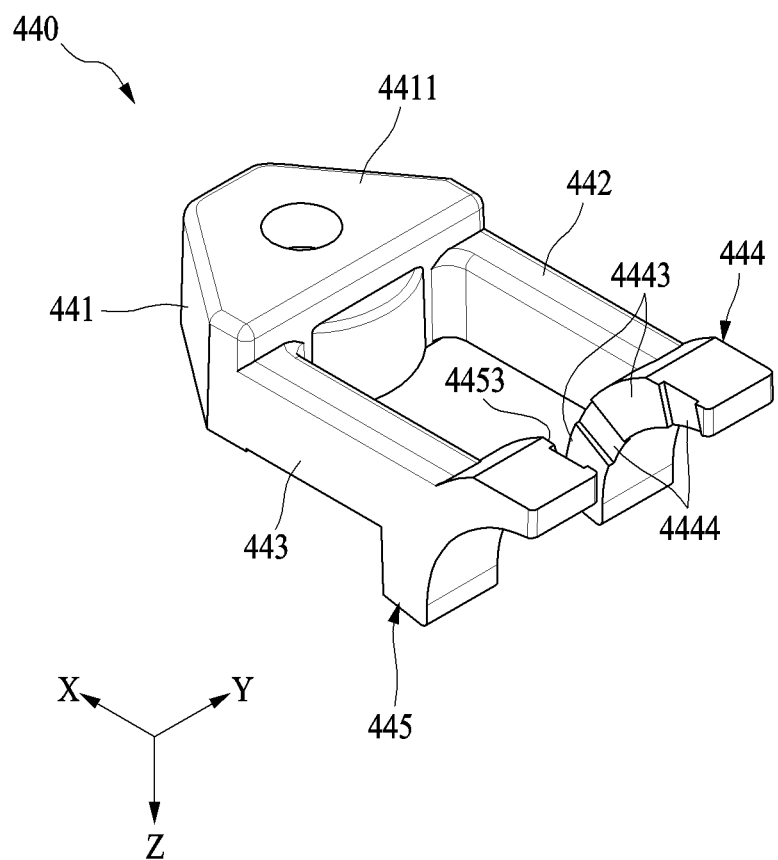
FIG. 4A is a perspective view illustrating a hinge structure of an electronic device according to an embodiment.
Figure 4B:
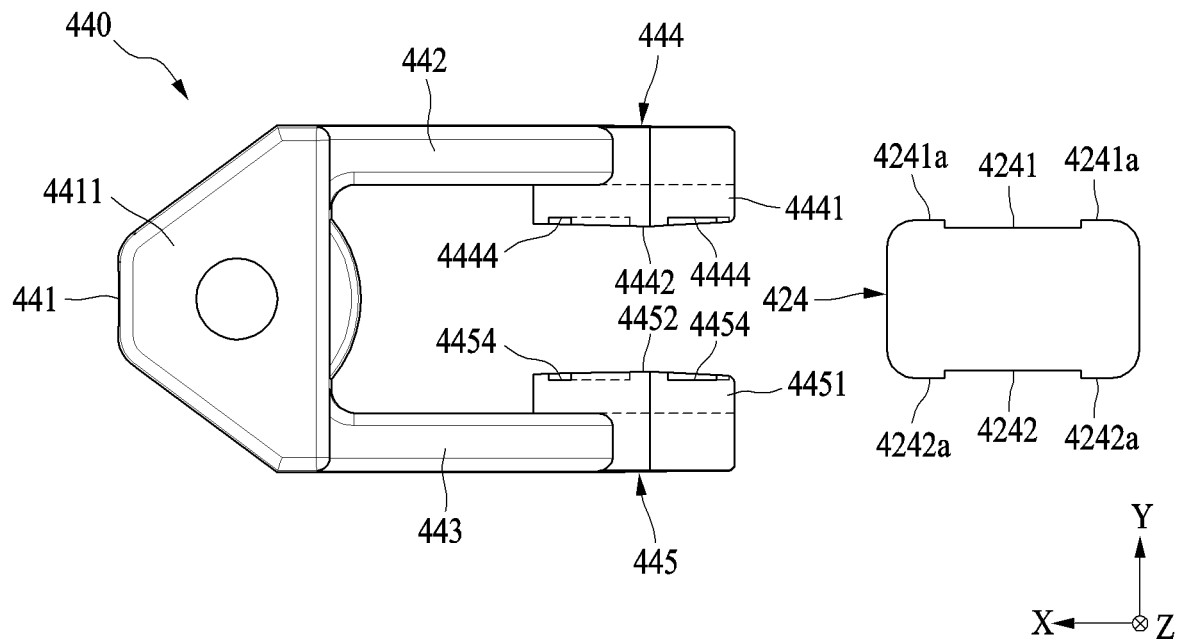
FIG. 4B is a view illustrating the hinge structure and a hinge protrusion of FIG. 4A.
Figure 4C:
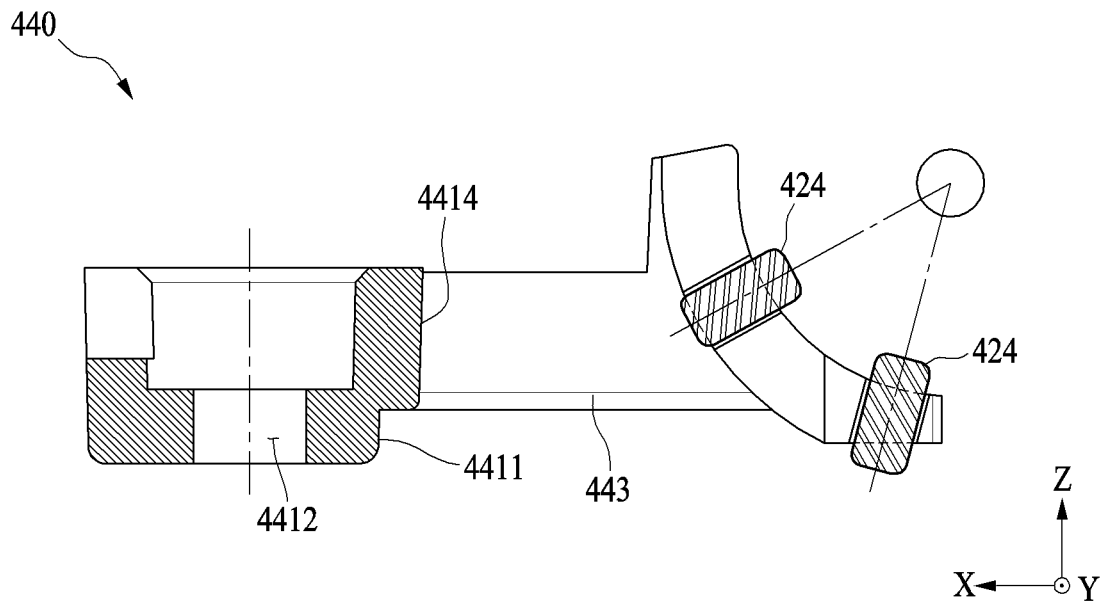
FIG. 4C is a cross-sectional view of the hinge structure and the hinge protrusion of FIG. 4B.

Referring to FIGS. 4A to 4C, structures of a hinge structure 440 (e.g., the hinge structure 340) and a hinge protrusion 424 (e.g., the hinge protrusion 324) of an electronic device (e.g., the electronic device 301) according to an embodiment are schematically shown. The hinge structure 440 may include a hinge fixing portion 441 (e.g., the hinge fixing portion 341), a first extension 442 (e.g., the first extension 342), a second extension 443 (e.g., the second extension portion 343), a first elastic portion 444 (e.g., the first elastic portion 344), and a second elastic portion 445 (e.g., the second elastic portion 345). The hinge fixing portion 441 may include a base 4411 (e.g., the base 3411), a second fixing hole 4412 (e.g., the second fixing hole 3412), a fastening member 4413 (e.g., the fastening member 3413), and a flange 4414 (e.g., the flange 3414). The first elastic portion 444 may include a first protruding portion 4441 (e.g., the first protruding portion 3441), and the second elastic portion 445 may include a second protruding portion 4451 (e.g., the second protruding to portion 3451). The hinge protrusion 424 may include a first outer surface 4241 (e.g., the first outer surface 3241) and a second outer surface 4242 (e.g., the second outer surface 3242).

In an embodiment, the hinge protrusion 424 may include a first boss 4241a protruding from the first outer surface 4241 and enclosing at least a portion of the first protruding portion 4441 and a second boss 4242a protruding from the second outer surface 4242 and enclosing at least a portion of the second protruding portion 4451. For example, the first boss 4241a may have a rail shape enclosing at least a portion of one surface (e.g., an inner side surface) of the first protruding portion 4441 close to the first extension 442 and at least a portion of the opposite surface (e.g., an outer side surface) of the first protruding portion 4441 far from the first extension 442, and the second boss 4242a may have a rail shape enclosing at least a portion of one surface (e.g., an inner side surface) of the second protruding portion 4451 close to the second extension 443 and at least a portion of the opposite surface (e.g., an outer surface) of the second protruding portion 4451 far from the second extension 443.

In an embodiment, the first protruding portion 4441 may include at least one first friction protrusion 4443 formed on a first contact surface 4442 that is in contact with the first outer surface 4241 of the hinge protrusion 424. In an embodiment, the second protruding portion 4451 may include at least one second friction protrusion 4453 formed on a second contact surface 4452 that is in contact with the second outer surface 4242 of the hinge protrusion 424. In an embodiment, the first protruding portion 4441 may include a plurality of first friction protrusions 4443, and at least one first recess 4444 between a pair of adjacent first friction protrusions 4443 configured to fit in the first boss 4241a. In an embodiment, the second protruding portion 4451 may include a plurality of second friction protrusions 4453, and at least one second recess 4454 between a pair of adjacent second friction protrusions 4453 configured to fit in the second boss 4242a.

Figure 5A:
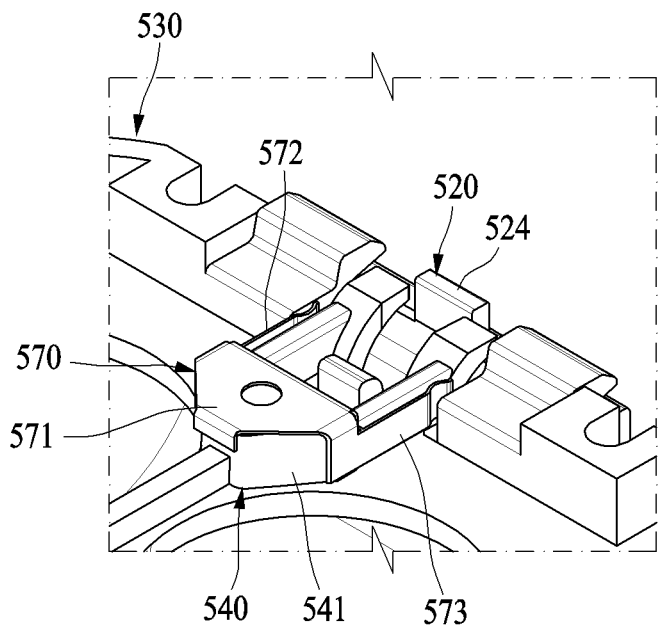
FIG. 5A is a view illustrating a portion of an electronic device including a hinge structure according to an embodiment.
Figure 5B:
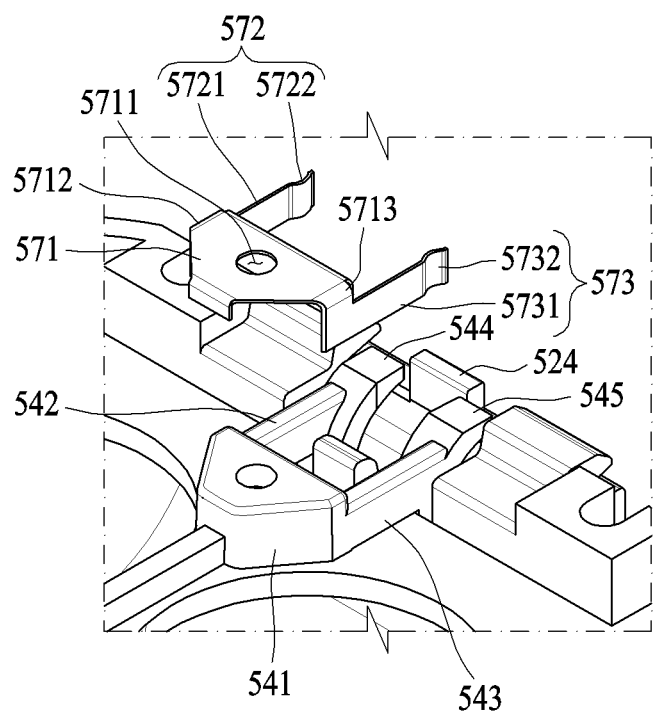
FIG. 5B is an exploded perspective view of the portion of the electronic device of FIG. 5A.

Referring to FIGS. 5A and 5B, structures of a second housing 520 (e.g., the second housing 320), a support body 530 (e.g., the support body 330), a hinge structure 540 (e.g., the hinge structure 440), and an elastic support 570 of an electronic device (e.g., the electronic device 301) are schematically shown. The second housing 520 may include a hinge protrusion 524 (e.g., the hinge protrusion 324). The hinge structure 540 may include a hinge fixing portion 541 (e.g., the hinge fixing portion 341), a first extension 542 (e.g., the first extension 342), a second extension 543 (e.g., the second extension portion 343), a first elastic portion 544 (e.g., the first elastic portion 344), and a second elastic portion 545 (e.g., the second elastic portion 345).

The elastic support 570 may elastically support the hinge structure 540. The elastic support 570 may be coupled to the support body 530 and the hinge structure 540. In an embodiment, the elastic support 570 may be formed of stainless steel and/or other rigid materials.

In an embodiment, the elastic support 570 may include a fixing plate 571, a first extension plate 572, and a second extension plate 573. The fixing plate 571 may be fixed to the hinge fixing portion 541. In an embodiment, the fixing plate 571 may include a third fixing hole 5711, and when a fastening member (e.g., the fastening member 3413) is fastened to a first fixing hole (e.g., the first fixing hole 3311c), a second fixing hole 5412 (e.g., the second fixing hole 3412), and the third fixing hole 5711, the fixing plate 571 may be fixed to the hinge fixing portion 541. The first extension plate 572 may extend along the first extension 542 and elastically support the first extension 542. The first extension plate 572 may be connected to a first portion 5712 of the fixing plate 571. The second extension plate 573 may extend along the second extension 543 and elastically support the second extension 543. The second extension plate 573 may be connected to a second portion 5713 of the fixing plate 571.

In an embodiment, the first extension plate 572 may include a first linear part 5721 and a first curved part 5722. The first linear part 5721 may be connected to the first portion 5712 of the fixing plate 571 and spaced apart from the first extension 542. The first curved part 5722 may continue from the first linear part 5721, be curved toward one surface (e.g., an outer side surface) of the first extension 542, and be in contact with the one surface of the first extension 542 and press the first extension 542. The second extension plate 573 may include a second linear part 5731 and a second curved part 5732. The second linear part 5731 may be connected to the second part 5713 of the fixing plate 571 and spaced apart from the second extension 543. The second curved part 5732 may continue from the second linear part 5731, be curved toward one surface (e.g., an outer side surface) of the second extension 543, and be in contact with the one surface of the second extension 543 and press the second extension 543.

In an embodiment, the fixing plate 571, the first extension plate 572, and the second extension plate 573 may be seamlessly integrally formed.

The structure of the elastic support 570 may further improve pressing the hinge protrusion 524 by the first elastic portion 544 and the second elastic portion 545. Thus, the feeling (e.g., tightness) of suppressing or delaying the rotation of the second housing 520 with respect to a first housing (e.g., the first housing 310), provided to the user, may be further intensified. In addition, the elastic support 570 may prevent damage to the hinge structure 540 by protecting at least a portion of the hinge structure 540, and improve a tension life of the first elastic portion 544 and/or the second elastic portion 545 by preventing the first elastic portion 544 and/or the second elastic portion 545 from loosening.

Figure 6A:
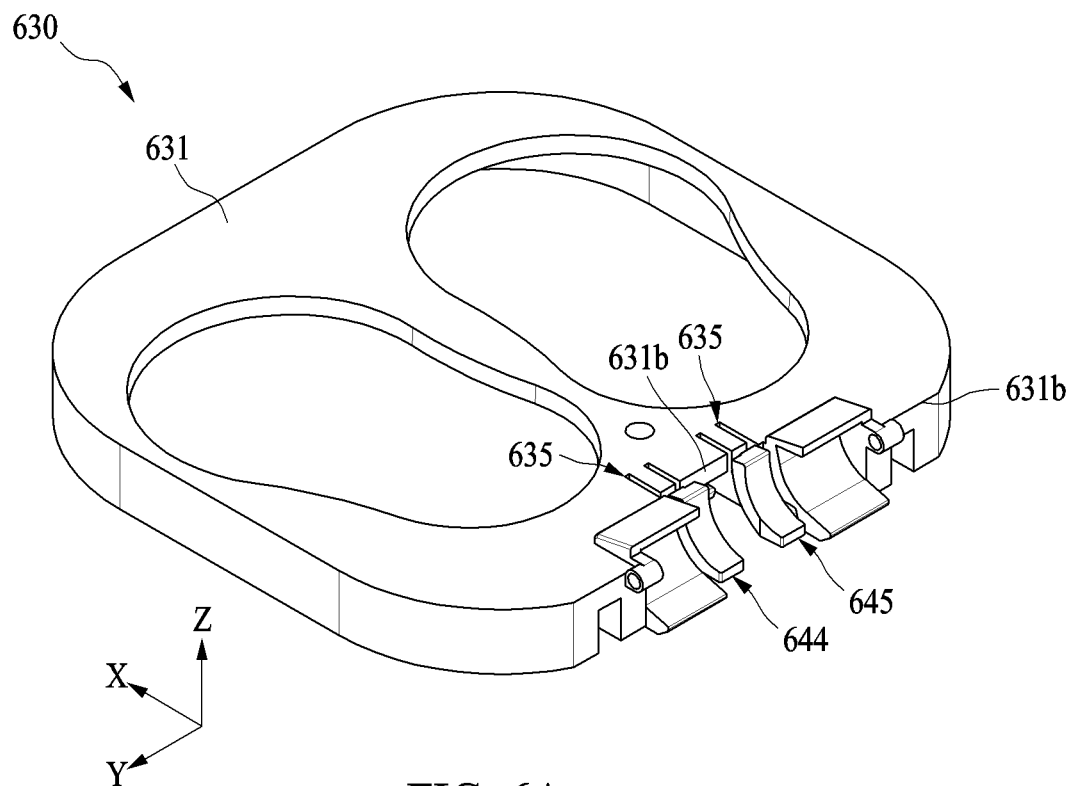
FIG. 6A is a perspective view of a support body including a hinge structure according to an embodiment.
Figure 6B:
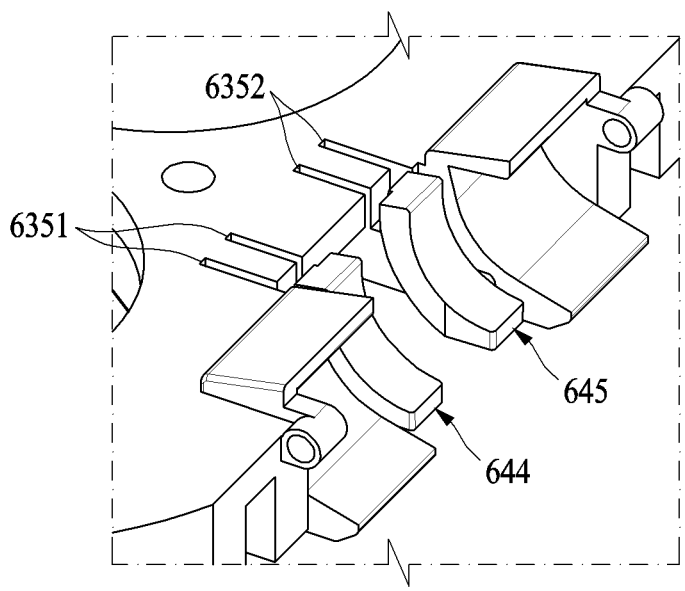
FIG. 6B is an enlarged view of a portion of the support body of FIG. 6A.

Referring to FIGS. 6A and 6B, a support body 630 (e.g., the support body 330) of an electronic device (e.g., the electronic device 301), according to an embodiment, may have a structure that is formed seamlessly integrally with a hinge structure (e.g., the hinge structure 340).

The support body 630 may include a first elastic portion 644 (e.g., the first elastic to portion 344) and a second elastic portion 645 (e.g., the second elastic portion 345) formed on an outer edge 631b (e.g., the outer edge 331b) of a main rim 631 (e.g., the main rim 331). The first elastic portion 644 and the second elastic portion 645 may be configured to be coupled by interference fit to a hinge protrusion (e.g., the hinge protrusion 324) of a second housing (e.g., the second housing 320) while pressing the hinge protrusion.

The support body 630 may include a plurality of relief grooves 635 for helping the first elastic portion 644 and the second elastic portion 645 with elastic deformation. In an embodiment, the plurality of relief grooves 635 may include a pair of first relief grooves 6351 and a pair of second relief grooves 6352. The pair of first relief grooves 6351 and the pair of second relief grooves 6352 may be formed on the outer edge 631b of the main rim 631.

In an embodiment, the pair of first relief grooves 6351 and the pair of second relief grooves 6352 may be formed on the outer edge 631b of the main rim 631 and extend toward the first elastic portion 644 and the second elastic portion 645. In an embodiment, an extension length of each of the pair of first relief grooves 6351 may be substantially the same as an extension length of each of the pair of second relief grooves 6352.

In an embodiment, of the pair of first relief grooves 6351, one first relief groove 6351 may be formed on one side (e.g., an outer side) of the first elastic portion 644, and the other first relief groove 6351 may be formed on the other side (e.g., an inner side) of the first elastic portion 644. Of the pair of second relief grooves 6352, one second relief groove 6352 may be formed on one side (e.g., an outer side) of the second elastic portion 645, and the other second relief groove 6352 may be formed on the other side (e.g., an inner side) of the second elastic portion 645.

In an embodiment, the support body 630 having a structure formed seamlessly integrally with the hinge structure (e.g., the hinge structure 340) may be formed of an elastic material (e.g., plastic).

Figure 7A:
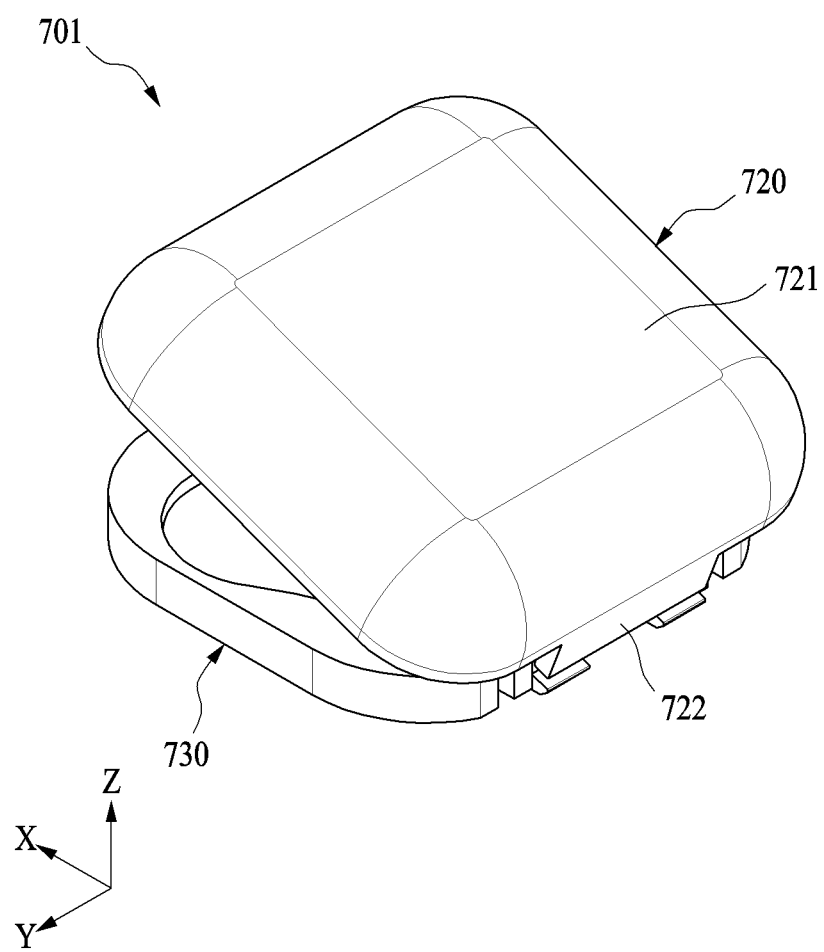
FIG. 7A is a perspective view illustrating a portion of an electronic device including a hinge structure according to an embodiment.
Figure 7B:
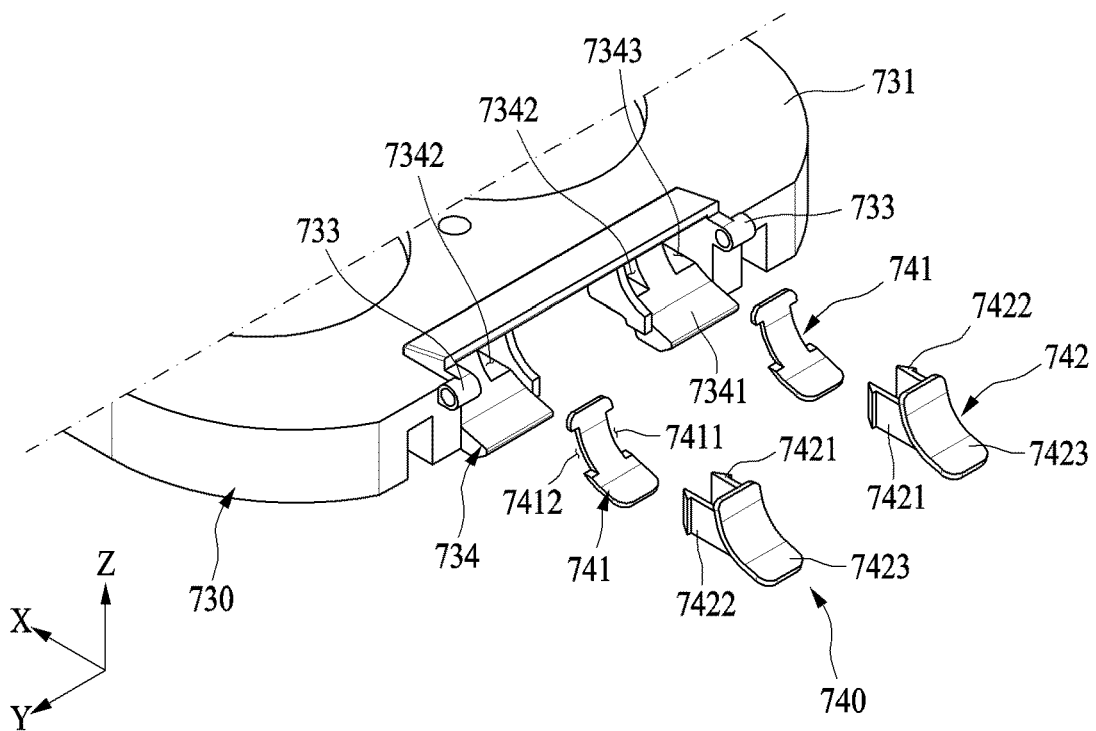
FIG. 7B is an exploded perspective view of the electronic device of FIG. 7A.
Figure 7C:
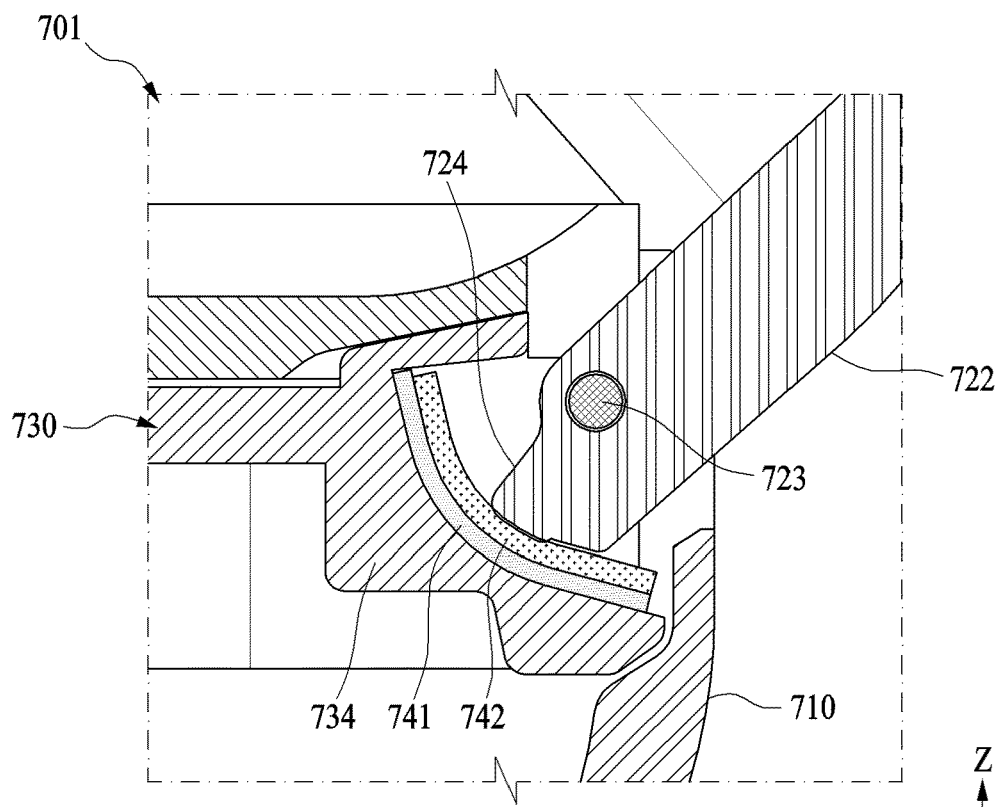
FIG. 7C is a cross-sectional view of the electronic device of FIG. 7A viewed along 7C-7C.

Referring to FIGS. 7A to 7C, an electronic device 701 (e.g., the electronic device to 301) according to an embodiment may include a first housing 710 (e.g., the first housing 310), a second housing 720 (e.g., the second housing 320), a support body 730 (e.g., the support body 330), a hinge structure 740 (e.g., the hinge structure 340), a PCB (e.g., the PCB 350), and an energy storage and charging module (e.g., the energy storage and charging module 360). The second housing 720 may include a cover 721 (e.g., the cover 321), a hinge engaging portion 722 (e.g., the hinge engaging portion 322), a hinge shaft 723 (e.g., the hinge shaft 323), and one or more (e.g., two) hinge protrusions 724 (e.g., the hinge protrusion 324). The support body 730 may include a main rim 731 (e.g., the main rim 331), a separation rim (e.g., the separation rim 332), a hinge coupler 733 (e.g., the hinge coupler 333), and at least one first hinge slide 734 (e.g., the hinge slide 334).

The hinge structure 740 may include at least one elastic body 741 and at least one second hinge slide 742.

The elastic body 741 may be configured to elastically deform. The elastic body 741 may be positioned on the first hinge slide 734. In an embodiment, the elastic body 741 may extend along the first hinge slide 734. In an embodiment, an extension length of the elastic body 741 may be significantly greater than a thickness of the elastic body 741. In an embodiment, the elastic body 741 may be configured to elastically deform in a thickness direction of the elastic body 741. In an embodiment, the elastic body 741 may be configured to elastically deform in the thickness direction of the elastic body 741 and then return to its original shape. In an embodiment, the elastic body 741 may substantially overlap a slide area 7341 of the first hinge slide 734. In an embodiment, the elastic body 741 may be formed of a thermoplastic material.

The second hinge slide 742 may be positioned on the elastic body 741, in frictional contact with the hinge protrusion 724, and pressed by the hinge protrusion 724. In an embodiment, the second hinge slide 742 may be in frictional contact with one surface (e.g., the fourth outer surface 3244, a bottom surface) of the hinge protrusion 724. In another embodiment not shown, the second housing 720 may not include at least one hinge protrusion 724, and one surface (e.g., the third surface 3223, the bottom surface) of the hinge engaging portion 722 may be in frictional contact with the second hinge slide 742 by pressing the second hinge slide 742.

In an embodiment, the second hinge slide 742 may include a first coupling portion 7421, a second coupling portion 7422, and a guide portion 7423. The first coupling portion 7421 may pass through a first side 7411 (e.g., an inner side) of the elastic body 741 and be coupled to a first portion 7342 (e.g., an inner portion) of the first hinge slide 734. The second coupling portion 7422 may pass through a second side 7412 (e.g., an outer side) on an opposite side of the first side 7411 of the elastic body 741 and be coupled to a second portion 7343 (e.g., an outer portion) on an opposite side of the first portion 7342 of the second hinge slide 742. The guide portion 7423 may be connected to the first coupling portion 7421 and the second coupling portion 7422 and guide at least a portion of the hinge protrusion 724 and/or the hinge engaging portion 722. While the second housing 720 is rotating about the hinge shaft 723, the guide portion 7423 may be in direct contact with the hinge protrusion 724 and pressed by the hinge protrusion 724. When the guide portion 7423 is pressed, a pressure absorbed by the guide portion 7423 may be transferred to the elastic body 741, such that a predetermined pressure may be exerted against the elastic body 741. As described above, a pressure exerted in the thickness direction of the elastic body 741 and a pressure exerted in the thickness direction of the guide portion 7423 may implement a free-stop of the second housing 720 by stopping the second housing 720 at a predetermined rotation position of the second housing 720 with respect to the first housing 710 while the second housing 720 is being rotated.

In an embodiment, the first coupling portion 7421 and the second coupling portion 7422 may extend from the guide portion 7423. In an embodiment, the first coupling portion 7421 and the second coupling portion 7422 may extend parallel to each other.

In an embodiment, the first coupling portion 7421 and the second coupling portion 7422 may have a hook shape, and the first portion 7342 and the second portion 7343 of the first hinge slide 734 may include recesses for receiving at least a portion of the first coupling portion 7421 and at least a portion of the second coupling portion 7422, respectively.

In an embodiment, the guide portion 7423 may include a curved surface having a profile corresponding to a rotation trajectory of the second housing 720 about the hinge shaft 723. In an embodiment, the curved surface of the guide portion 7423 may have a roughness configured to apply a weight to the rotation of the second housing 720. When a total weight of the second housing 720 may increase as the second housing 720 is covered with a separate cover body, a rough surface of the guide portion 7423 may cause the user to respond to the sense of weight according to a change in the weight of the second housing 720.

In an embodiment, the second hinge slide 742 may be formed of an elastic material (e.g., plastic). In another embodiment, the second hinge slide 742 may be formed of a metal material (e.g., stainless steel). A thickness of the guide portion 7423 of the second hinge slide 742 in the present embodiment may be smaller than a thickness of the guide portion 7423 of the second hinge slide 742 formed of an elastic material. For example, the second hinge slide 742 formed of a metal material may include a guide portion 7423 having a thickness of about 0.15 mm.

In an embodiment, the support body 730 may include a pair of first hinge slides 734, and the hinge structure 740 may include a pair of elastic bodies 741 respectively positioned in the pair of first hinge slides 734 and a pair of second hinge slides 742 respectively positioned in the pair of elastic bodies 741.

Figure 8:
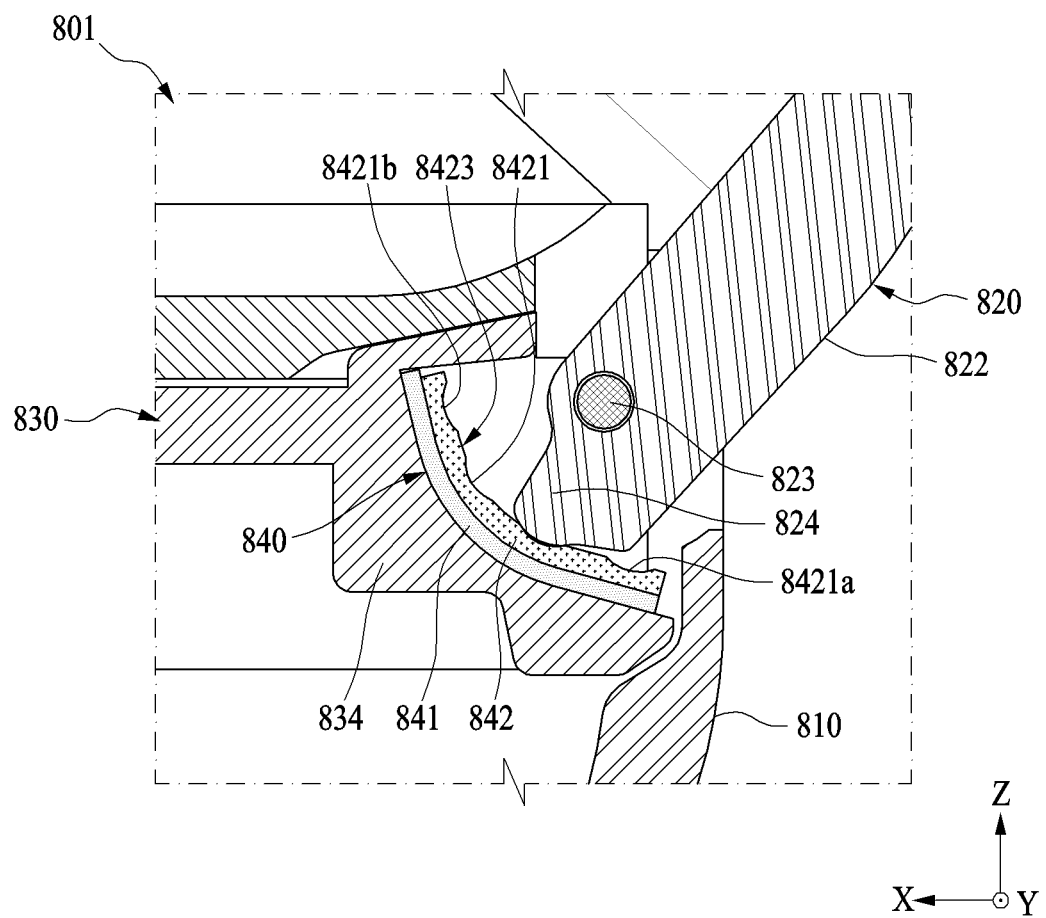
FIG. 8 is a view of an electronic device including a hinge structure according to an embodiment.
Figure 9A:
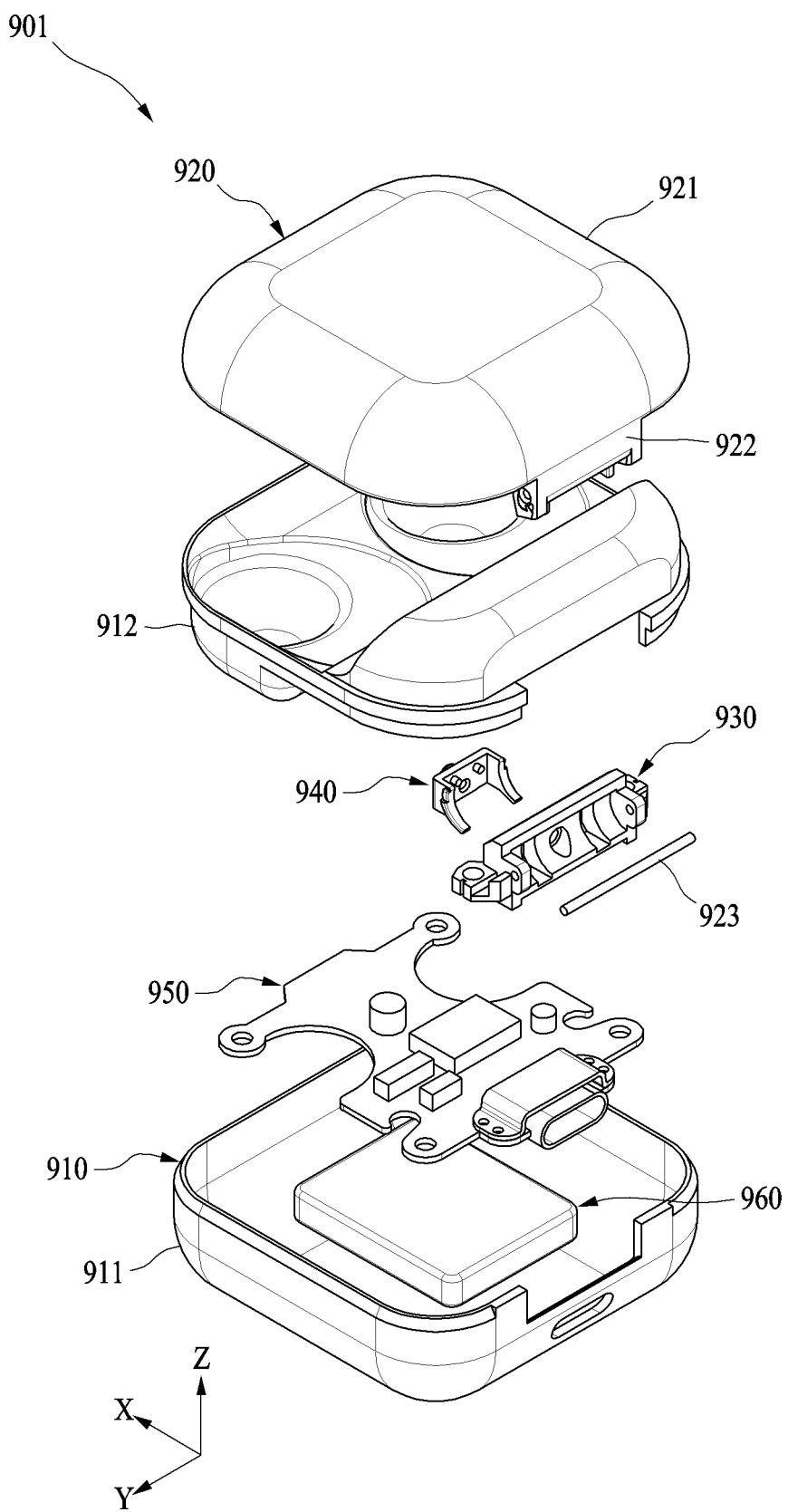
FIG. 9A is an exploded perspective view of an electronic device including a hinge structure according to an embodiment.
Figure 9B:
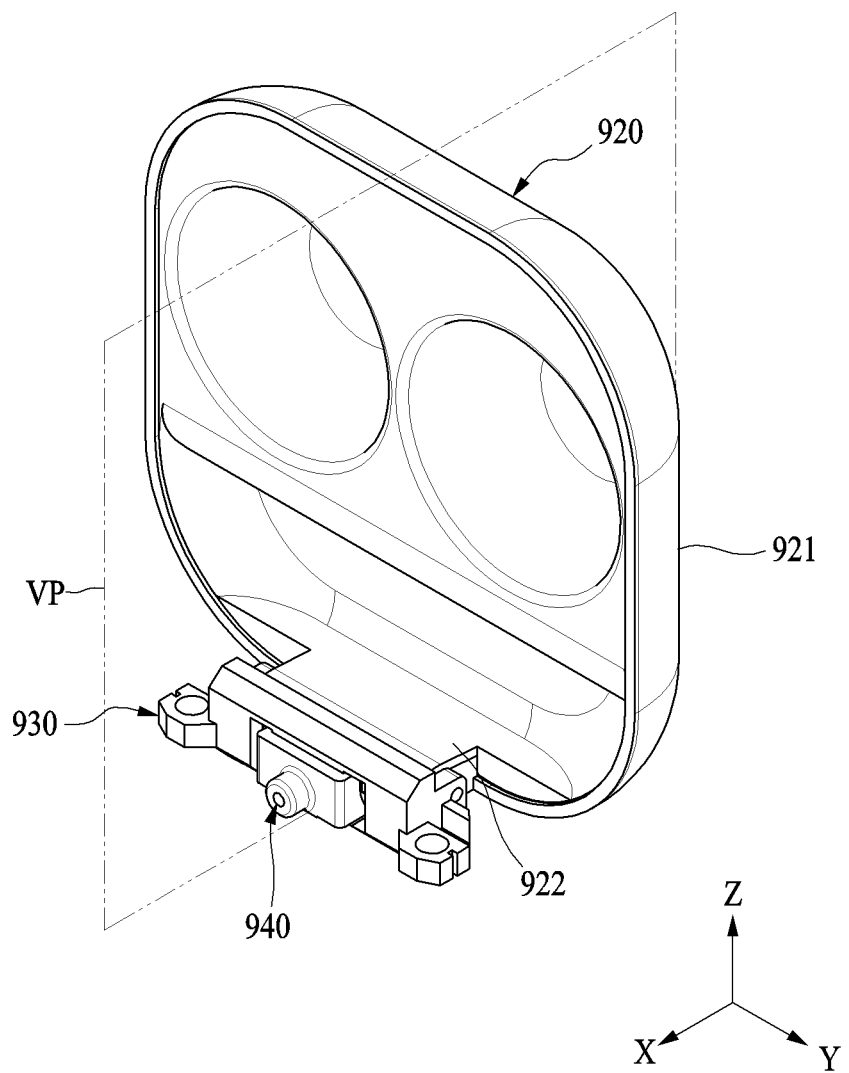
FIG. 9B is a perspective view of a structure in which a hinge structure and a second housing are coupled, viewed from one direction according to an embodiment.
Figure 9C:
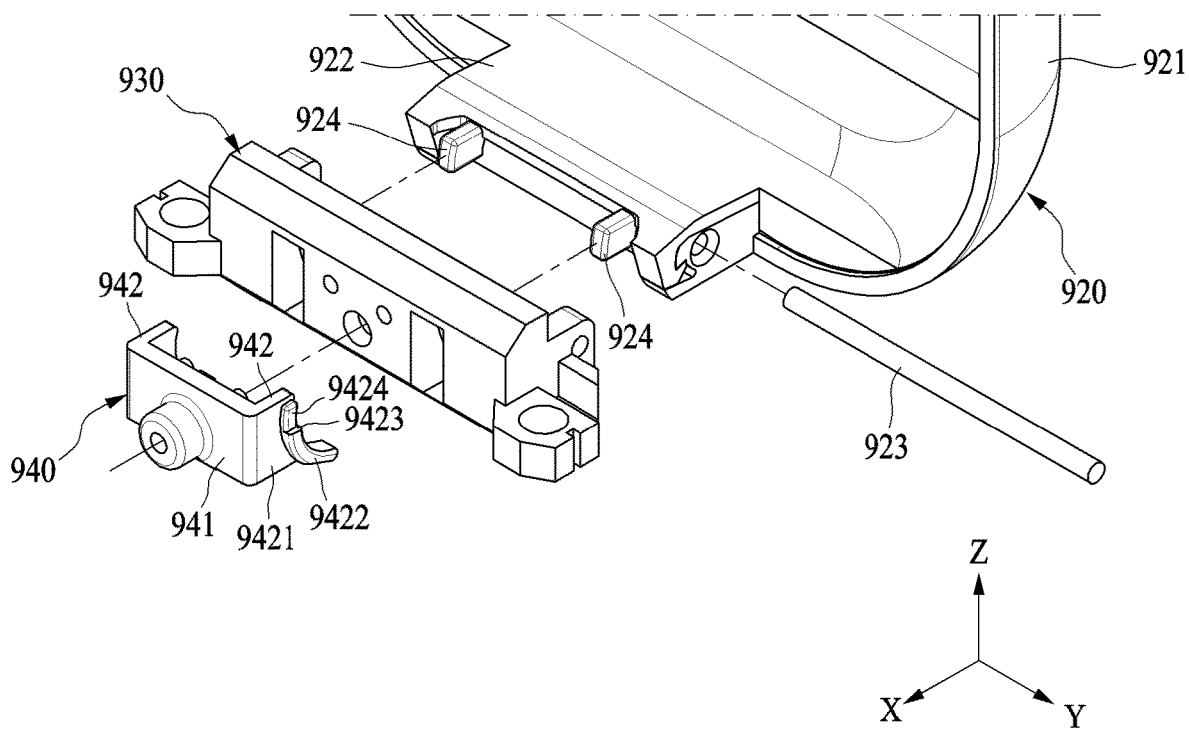
FIG. 9C is an exploded perspective view of a hinge structure and a second housing according to an embodiment.
Figure 9D:
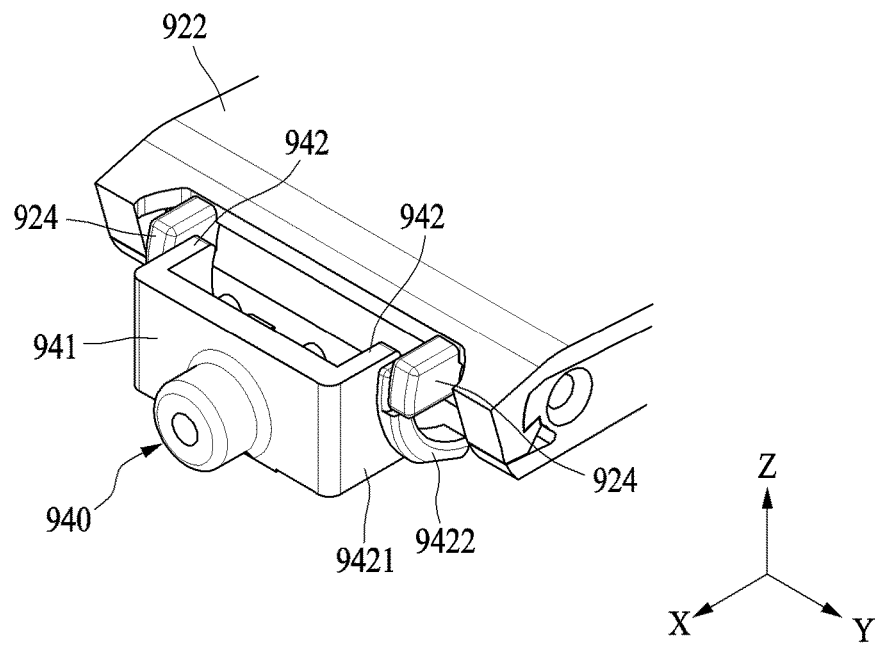
FIG. 9D is a perspective view of a structure in which a hinge structure and a second housing are coupled, viewed from another direction according to an embodiment.
Figure 9E:
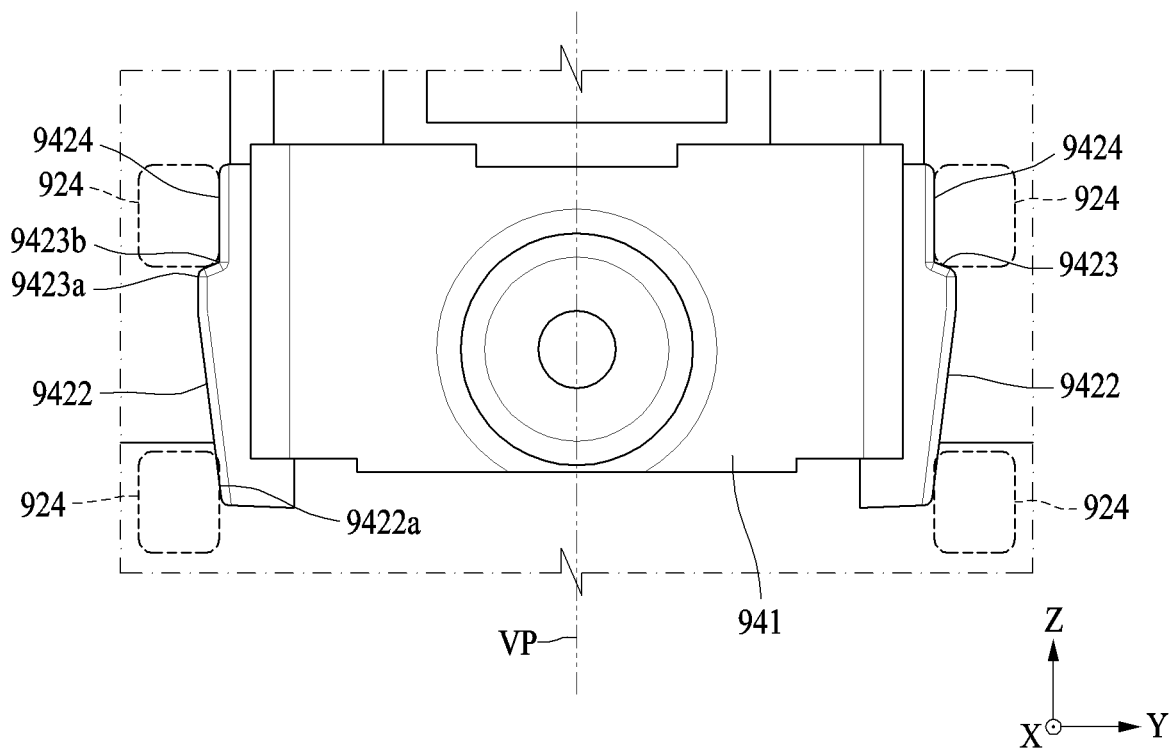
FIG. 9E is a front view of a structure in which a hinge structure and a second housing are coupled according to an embodiment.
Figure 9F:
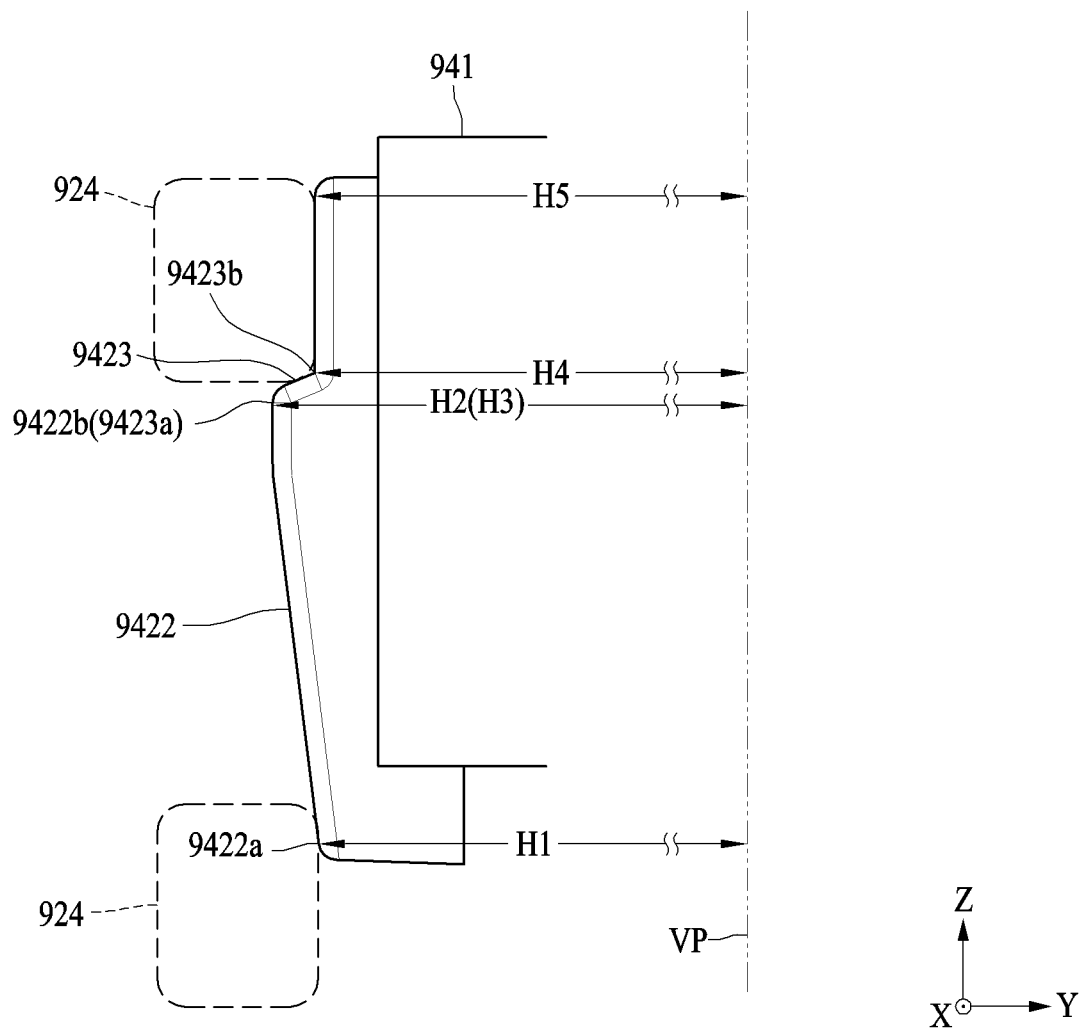
FIG. 9F is a view to describe dimensions of a first contact surface, a second contact surface, and a third contact surface of a second base of FIG. 9E.
Figure 9G:
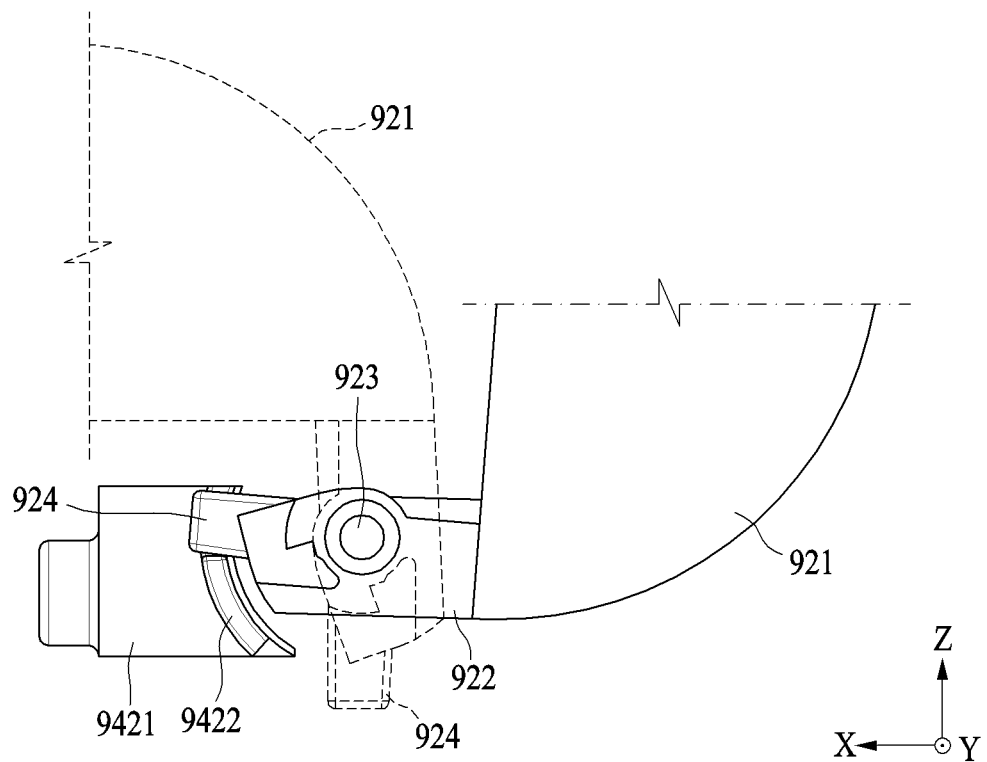
FIG. 9G is a side view of a structure in which a hinge structure and a second housing are coupled according to an embodiment.
Figure 9H:
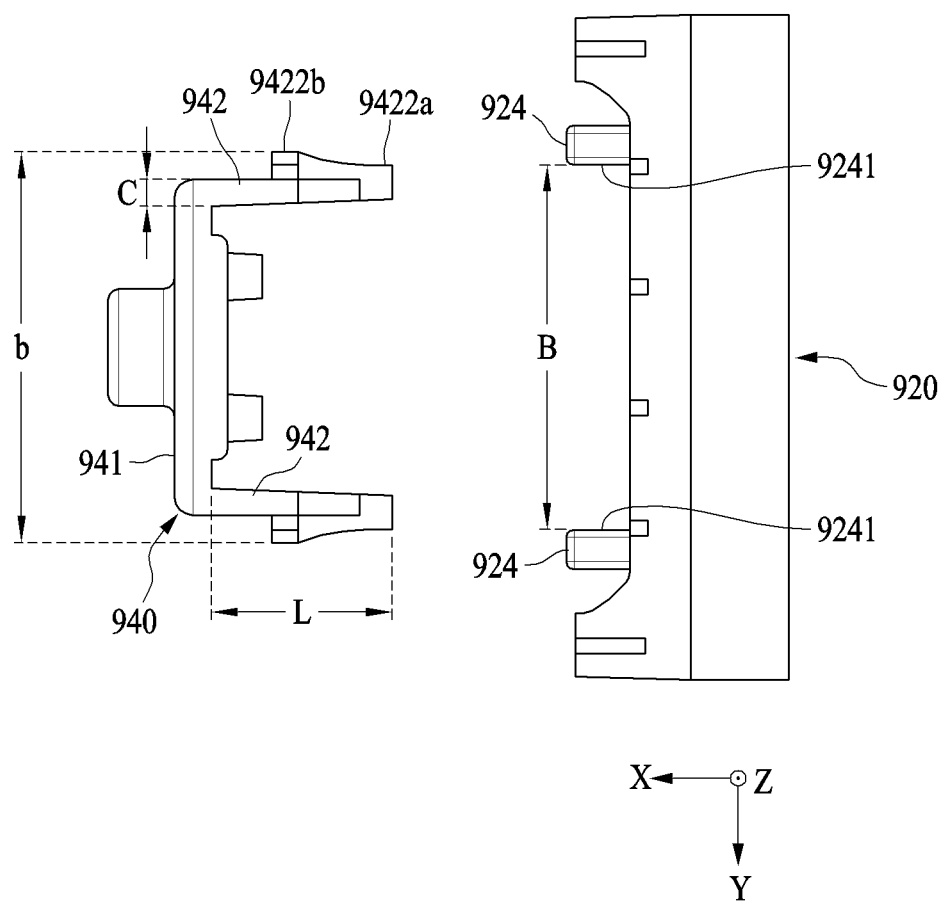
FIG. 9H is a view illustrating a state of a hinge structure and a second housing before assembled according to an embodiment.

Referring to FIG. 8, an electronic device 801 (e.g., the electronic device 701) according to an embodiment may include a first housing 810 (e.g., the first housing 710), a second housing 820 (e.g., the second housing 720), a support body 830 (e.g., the support body 730), a hinge structure 840 (e.g., the hinge structure 740), a PCB (e.g., the PCB 350), and an energy storage and charging module (e.g., the energy storage and charging module 360). The second housing 820 may include a cover (e.g., the cover 721), a hinge engaging portion 822 (e.g., the hinge engaging portion 722), a hinge shaft 823 (e.g., the hinge shaft 723), and a hinge protrusion 824 (e.g., the hinge protrusion 724). The support body 830 may include a main rim (e.g., the main rim 731), a separation rim (e.g., the separating rim 732), a hinge coupler (e.g., the hinge coupler 733), and at least one first hinge slide 834 (e.g., the hinge slide 734). The hinge structure 840 may include at least one elastic body 841 (e.g., the elastic body 741) and at least one second hinge slide 842 (e.g., the second hinge slide 742). The second hinge slide 842 may include a first coupling portion (e.g., the first coupling portion 7421), a second coupling portion (e.g., the second coupling portion 7422), and a guide portion 8423 (e.g., the guide portion 7423). The guide portion 8423 may include a curved surface having a profile corresponding to a rotation trajectory of the second housing 820 about the hinge shaft 823.

In an embodiment, the second hinge slide 842 may include at least one recess 8421 configured to fit in the hinge protrusion 824 moving along the curved surface of the guide portion 8423. The recess 8421 may be formed on the curved surface of the guide portion 8423 in a thickness direction of the guide portion 8423. When a total weight of the second housing 820 may increase as the second housing 820 is covered with a separate cover body, the recess 8421 formed in the guide portion 8423 may cause the user to respond to the sense of weight according to a change in the weight of the second housing 820.

In an embodiment, the second hinge slide 842 may include a plurality of recesses 8421, and the plurality of recesses 8421 may be spaced apart from each other along the curved surface of the guide portion 8423. Positions at which the plurality of recesses 8421 are formed on the curved surface of the guide portion 8423 may be defined to correspond to a plurality of rotation positions of the second housing 820 with respect to the first housing 810, respectively. For example, when the hinge protrusion 824 fits in a first recess 8421$a$ close to one end portion of the guide portion 8423, an angle between the first housing 810 and the second housing 820 may be about 0°. When the hinge protrusion 824 fits in a second recess 8421$b$ close to the other end portion of the guide portion 8423, the angle between the first housing 810 and the second housing 820 may be an obtuse angle, e.g., about 100°.

Referring to FIGS. 9A to 9H, an electronic device 901 (e.g., the electronic device 201) according to an embodiment may include a first housing 910 (e.g., the first housing 210), a second housing 920 (e.g., the second housing 220), a support body 930 (e.g., the support body 330), a hinge structure 940 (e.g., the hinge structure 340), a PCB 950 (e.g., the PCB 350), and an energy storage and charging module 960 (e.g., the energy storage and charging module 360). The first housing 910 may include an outer case 911 (e.g., the outer case 211) and a front case 912 (e.g., the front case 212). The second housing 920 may include a cover 921 (e.g., the cover 221), a hinge engaging portion 922 (e.g., the hinge engaging portion 222), a hinge shaft 923 (e.g., the hinge shaft 323), and a pair of hinge protrusions 924 (e.g., the hinge protrusion 324). In an embodiment, the support body 930, the hinge structure 940, the PCB 950, and the energy storage and charging module 960 may be positioned between the first housing 910 and the second housing 920. In an embodiment, the support body 930 and the hinge structure 940 may be positioned between the front case 912 and the PCB 950.

The hinge structure 940 may semi-automatically open and close the second housing 920 with respect to the first housing 910 without a free-stop. In an embodiment, the hinge structure 940 may include a first base 941 facing at least a portion of the hinge engaging portion 922 between the pair of hinge protrusions 924 and a pair of second bases 942 connected to end portions of the first base 941 and extending toward the hinge engaging portion 922. In another embodiment, the hinge structure 940 may include the first base 941 and a single second base 942 connected to the first base 941. In the present embodiment, the second housing 920 may include a single hinge protrusion 924.

In an embodiment, the second base 942 may include a non-contact surface 9421 that is not in contact with the hinge protrusion 924, and a first contact surface 9422 and a second contact surface 9423 that are in contact with the hinge protrusion 924. The hinge protrusion 924 may be positioned on one of the first contact surface 9422 and the second contact surface 9423 depending on the rotation position of the second housing 920 with respect to the first housing 910. The first contact surface 9422 may be in contact with the hinge protrusion 924 while the second housing 920 is transitioning between a closing position (e.g., FIG. 2A) at which the second housing 920 substantially forms a first angle (e.g., about 0°) with respect to the first housing 910 and an intermediate position at which the second housing 920 defines a third angle (e.g., about 87°) with respect to the first housing 910. The second contact surface 9423 may be in contact with the hinge protrusion 924 while the second housing 920 is transitioning between the intermediate position at which the second housing 920 substantially forms the third angle (e.g., about 87°) with respect to the first housing 910 and an opening position (e.g., FIG. 2B) at which the second housing 920 substantially forms a second angle (e.g., about 95°) with respect to the first housing 910.

In an embodiment, the hinge protrusion 924 may be in frictional contact with the first contact surface 9422 and the second contact surface 9423. In an embodiment, the hinge protrusion 924 may press the first contact surface 9422 and the second contact surface 9423 while the second housing 920 is rotating with respect to the first housing 910 from the closing position via the intermediate position to the opening position. In the present embodiment, the second base 942 and the hinge protrusion 924 may engage to overlap each other so that the hinge protrusion 924 may apply tension to the first contact surface 9422 and the second contact surface 9423.

In an embodiment, the first base 941 and the second base 942 may be formed of an elastically deformable material. In some embodiments, only the second base 942 may be formed of an elastically deformable material. In an embodiment, the second base 942 may exhibit a restoring force in a direction to push the hinge protrusion 924 while the hinge protrusion 924 is pressing the first contact surface 9422 and the second contact surface 9423, enabling a sliding operation of the hinge protrusion 924.

In an embodiment, the friction force of the hinge protrusion 924 against the first contact surface 9422 and the second contact surface 9423 and/or the restoring force of the second base 942 may be determined based on a thickness C of the second base 942, a length L of the second base 942 extending from the first base 941, a distance B between inner side surfaces 9241 of the pair of hinge protrusions 924, and/or a distance b between second portions 9422b of the pair of first contact surfaces 9422.

In an embodiment, the first contact surface 9422 may be inclined with respect to an imaginary rotation reference plane VP (e.g., a plane parallel to an XZ plane). Here, the "rotation reference plane VP" is an imaginary plane including a first centerline (e.g., the first centerline C1) of the first housing 910 and a second centerline (e.g., the second centerline C2) of the second housing 920) and divides each of the first housing 910 and the second housing 920 into two, and the second housing 920 may rotate with respect to the first housing 910 in a tangential direction of the rotation reference plane VP. When the second housing 920 is at the closing position with respect to the first housing 910, the first contact surface 9422 may include a first portion 9422a having a first height H1 with respect to the rotation reference plane VP, and when the second housing 920 is at the intermediate position with respect to the first housing 910, the first contact surface 9422 may include a second portion 9422b having a second height H2 greater than the first height H1 with respect to the rotation reference plane VP. While the second housing 920 is rotating with respect to the first housing 910 from the closing position to the intermediate position, a portion of the hinge protrusion 924 that is in contact with the first contact surface 9422 may move from the first portion 9422a of the first contact surface 9422 to the second portion 9422b. The tension of the hinge protrusion 924 with respect to the first contact surface 9422 may gradually increase from the first portion to 9422a toward the second portion 9422b. Meanwhile, while the second housing 920 is rotating with respect to the first housing 910 from the intermediate position toward the closing position, the portion of the hinge protrusion 924 that is in contact with the first contact surface 9422 may move from the second portion 9422b of the first contact surface 9422 to the first portion 9422a. The tension of the hinge protrusion 924 with respect to the first contact surface 9422 may gradually decrease from the second portion 9422b toward the first portion 9422a.

In an embodiment, a height of the first contact surface 9422 with respect to the rotation reference plane VP may vary according to a rotation position of the second housing 920 with respect to the first housing 910. For example, from the first height H1 toward the second height H2 in the height of the first contact surface 9422 with respect to the rotation reference plane VP, a gradient of the first contact surface 9422 with respect to the rotation reference plane VP may be substantially constant. The gradient of the first contact surface 9422 with respect to the rotation reference plane VP may be non-linear.

In an embodiment, the second contact surface 9423 may be inclined with respect to the rotation reference plane VP. When the second housing 920 is at the intermediate position with respect to the first housing 910, the second contact surface 9423 may include a third portion 9423a having a third height H3 with respect to the rotation reference plane VP, and when the second housing 920 is at the opening position with respect to the first housing 910, the second contact surface 9423 may include a fourth portion 9423b having a fourth height H5 less than the third height H3 with respect to the rotation reference plane VP. While the second housing 920 is rotating with respect to the first housing 910 from the intermediate position toward the opening position, a portion of the hinge protrusion 924 that is in contact with the second contact surface 9423 may move from the third portion 9423a to the fourth portion 9423b. The tension of the hinge protrusion 924 with respect to the second contact surface 9423 may sharply decrease from the third portion 9423a toward the fourth to portion 9423b. Meanwhile, the tension of the hinge protrusion 924 with respect to the second contact surface 9423 may be more greatly required from the fourth portion 9423b toward the third portion 9423a. Accordingly, when the portion of the hinge protrusion 924 that is in contact with the second contact surface 9423 is about to move from the fourth portion 9423b to the third portion 9423a, the structure of the second contact surface 9423 may act as a step to suppress or delay the hinge protrusion 924 from moving from the second contact surface 9423 to the first contact surface 9422. In addition, this structure may also suppress or delay the second housing 920 from unintentionally rotating with respect to the first housing 910 from the opening position to the closing position when a weight of the second housing 920 increases as the second housing 920 is covered with a separate cover.

In an embodiment, a height of the second contact surface 9423 with respect to the rotation reference plane VP may vary according to a rotation position of the second housing 920 with respect to the first housing 910. For example, from the third height H3 toward the fourth height H4 in the height of the second contact surface 9423 with respect to the rotation reference plane VP, a gradient of the second contact surface 9423 with respect to the rotation reference plane VP may be substantially constant. The of the second contact surface 9423 with respect to the rotation reference plane VP may be non-linear.

In an embodiment, the first contact surface 9422 and the second contact surface 9423 may be continuously formed. In other words, the second height H2 of the second portion 9422b of the first contact surface 9422 may be substantially the same as the third height H3 of the third portion 9423a of the second contact surface 9423.

In an embodiment, the second base 942 may include a third contact surface 9424 that supports the hinge protrusion 924 and is in contact with the hinge protrusion 924 while the second housing 920 at the opening position with respect to the first housing 910. In an embodiment, the third contact surface 9424 may be substantially parallel to the rotation reference plane VP. In other words, a fifth height H5 of the third contact surface 9424 with respect to the rotation reference plane VP may be substantially constant. In an embodiment, the fifth height H5 may be substantially equal to the fourth height H4.

In an embodiment, the first contact surface 9422, the second contact surface 9423, and the third contact surface 9424 may protrude relative to the non-contact surface 9421. For example, the first contact surface 9422, the second contact surface 9423, and the third contact surface 9424 may each be implemented as a curved protruding rib that corresponds to a rotation trajectory of the second housing 920.

An electronic device according to an embodiment may include: a first housing 910; a second housing 920 including a cover 921 configured to face the first housing 910, a hinge engaging portion 922 formed in the cover 921, and a hinge protrusion 924 formed in the hinge engaging portion 922; and a hinge structure 940 positioned between the first housing 910 and the second housing 920 to rotate the second housing 920 with respect to the first housing 910 so as to cause the second housing 920 to pass through an intermediate position at which the first housing 910 and the second housing 920 define a third angle between a first angle and a second angle, between a closing position at which the first housing 910 and the second housing 920 define the first angle and an opening position at which the first housing 910 and the second housing 920 define the second angle, the hinge structure 940 including a first base 941 facing the hinge engaging portion 922 and a second base 942 connected to the first base 941, and the second base 942 may include: a first contact surface 9422 to contact the hinge protrusion 924 while the second housing 920 is transitioning between the closing position and the intermediate position; and a second contact surface 9423 to contact the hinge protrusion 924 while the second housing 920 is transitioning between the intermediate position and the opening position.

In an embodiment, the first contact surface 9422 may vary between a first height H1 with respect to a rotation reference plane VP and a second height H2, which is different from the first height H1, with respect to the rotation reference plane VP, and the rotation reference plane VP may be defined as an imaginary plane including a first centerline C1 of the first housing 210, 910 and a second centerline C2 of the second housing 220, 920.

In an embodiment, the first height H1 may be a height at the closing position, the second height H2 may be a height at the intermediate position, and the second height H2 may be greater than the first height H1.

In an embodiment, a pressure exerted by the hinge protrusion 924 against the first contact surface 9422 may increase while the second housing 920 is transitioning from the closing position toward the intermediate position.

In an embodiment, the second contact surface 9423 may vary between a third height H3 with respect to a rotation reference plane VP and a fourth height H4, which is different from the third height H3, with respect to the rotation reference plane VP, and the rotation reference plane VP may be defined as an imaginary plane including a first centerline C1 of the first housing 210, 910 and a second centerline C2 of the second housing 220, 920.

In an embodiment, the third height H3 may be a height at the intermediate position, the fourth height H4 may be a height at the opening position, and the fourth height H4 may be less than the third height H3.

In an embodiment, a pressure exerted by the hinge protrusion 924 against the second contact surface 9423 may decrease while the second housing 920 is transitioning from the intermediate position toward the opening position.

In an embodiment, the second contact surface 9423 may be configured to suppress or delay the hinge protrusion 924 from entering the first contact surface 9422, when the second housing 920 transition from the opening position toward the closing position.

In an embodiment, the hinge structure 940 may further include a third contact surface 9424 that supports the hinge protrusion 924 to stay at the opening position.

In an embodiment, the third contact surface 9424 may be constant in height with respect to the rotation reference plane VP, and the rotation reference plane VP may be defined as an imaginary plane including a first centerline C1 of the first housing 210, 910 and a second centerline C2 of the second housing 220, 920.

An electronic device according to an embodiment may include: a first housing 910; a second housing 920 including a cover 921 configured to face the first housing 910, a hinge engaging portion 922 formed in the cover 921, and a pair of hinge protrusions 924 formed in the hinge engaging portion 922; and a hinge structure 940 positioned between the first housing 910 and the second housing 920 to rotate the second housing 920 with respect to the first housing 910 so as to cause the second housing 920 to pass through an intermediate position at which the first housing 910 and the second housing 920 define a third angle between a first angle and a second angle, between a closing position at which the first housing 910 and the second housing 920 define the first angle and an opening position at which the first housing 910 and the second housing 920 define the second angle, and the hinge structure 940 may include a first base 941 facing the hinge engaging portion 922 and a pair of second bases 942 connected to the first base 941, and the pair of second bases 942 may each include: a first contact surface 9422 to contact the hinge protrusion 924 while the second housing 920 is transitioning between the closing position and the intermediate position; and a second contact surface 9423 to contact the hinge protrusion 924 while the second housing 920 is transitioning between the intermediate position and the opening position.

In an embodiment, the first contact surface 9422 may vary between a first height H1 with respect to a rotation reference plane VP and a second height H2, which is different from the first height H1, with respect to the rotation reference plane VP, and the rotation reference plane VP may be defined as an imaginary plane including a first centerline C1 of the first housing 210, 910 and a second centerline C2 of the second housing 220, 920.

In an embodiment, the first height H1 may be a height at the closing position, the second height H2 may be a height at the intermediate position, and the second height H2 may be greater than the first height H1.

In an embodiment, pressures exerted by the pair of hinge protrusions 924 against the respective first contact surfaces 9422 may increase while the second housing 920 is transitioning from the closing position toward the intermediate position.

In an embodiment, the second contact surface 9423 may vary between a third height H3 with respect to a rotation reference plane VP and a fourth height H4, which is different from the third height H3, with respect to the rotation reference plane VP, and the rotation reference plane VP may be defined as an imaginary plane including a first centerline C1 of the first housing 210, 910 and a second centerline C2 of the second housing 220, 920.

In an embodiment, the third height H3 may be a height at the intermediate position, the fourth height H4 may be a height at the opening position, and the fourth height H4 may be less than the third height H3.

In an embodiment, pressures exerted by the pair of hinge protrusions 924 against the respective second contact surfaces 9423 may decrease while the second housing 920 is transitioning from the intermediate position toward the opening position.

In an embodiment, the second contact surface 9423 may be configured to suppress or delay the pair of hinge protrusions 924 from entering the respective first contact surfaces 9422, when the second housing 920 transitions from the opening position toward the closing position.

In an embodiment, the pair of second bases 942 may each further include a third contact surface 9424 that supports the pair of hinge protrusions 924 at the opening position.

An electronic device 901 according to an embodiment may include: a first housing 910 including an outer case 911 and a front case 912 positioned in at least a portion of the outer case 911 and having at least one cavity for receiving at least one wearable device; a second housing 920 including a cover 921 configured to face the outer case 911, a hinge engaging portion 922 formed in the cover 921, and a hinge protrusion 924 formed in the to hinge engaging portion 922; and a hinge structure 940 positioned between the first housing 910 and the second housing 920 to rotate the second housing 920 with respect to the first housing 910 so as to cause the second housing 920 to pass through an intermediate position at which the first housing 910 and the second housing 920 define a third angle between a first angle and a second angle, between a closing position at which the first housing 910 and the second housing 920 define the first angle and an opening position at which the first housing 910 and the second housing 920 define the second angle, and the hinge structure 940 may include a first base 941 facing the hinge engaging portion 922 and a second base 942 connected to the first base 941, and the second base 942 may include: a first contact surface 9422 to contact the hinge protrusion 924 while the second housing 920 is transitioning between the closing position and the intermediate position; and a second contact surface 9423 to contact the hinge protrusion 924 while the second housing 920 is transitioning between the intermediate position and the opening position.

An electronic device 301 according to an embodiment may include: a first housing 310; a second housing 320 including a cover 321 configured to face the first housing 310 and a hinge protrusion 324 formed in the cover 321; and a hinge structure 340 positioned between the first housing 310 and the second housing 320 and configured to rotate the second housing 320 with respect to the first housing 310 and stop the second housing 320 with respect to the first housing 310 at a predetermined rotation position, and the hinge structure 340 may include: a first elastic portion 344 configured to be in frictional contact with a first outer surface 3241 of the hinge protrusion 324 and elastically deform; and a second elastic portion 345 configured to be in frictional contact with a second outer surface 3242, opposite to the first outer surface 3241, of the hinge protrusion 324, and a distance D1 between the first elastic portion 344 and the second elastic portion 345 may be less than a distance D2 between the first outer surface 3241 and the second outer surface 3242 of the hinge protrusion 324.

In an embodiment, the first elastic portion 344 may be configured to press the first outer surface 3241 when in contact with the first outer surface 3241 of the hinge protrusion 324, and the second elastic portion 345 may be configured to press the second outer surface 3242 when in contact with the second outer surface 3242 of the hinge protrusion 324.

In an embodiment, the electronic device 301 may further include a support body 330 positioned between the first housing 310 and the second housing 320 that supports the hinge structure 340, and the hinge structure 340 may include: a hinge fixing portion 341 fixed to the support body 330; a first extension 342 connecting the hinge fixing portion 341 and the first elastic portion 344 and extending from the hinge fixing portion 341; and a second extension 343 connecting the hinge fixing portion 341 and the second elastic portion 345 and extending from the hinge fixing portion 341.

In an embodiment, the first elastic portion 344 may include a first protruding portion 3441 protruding in a direction intersecting with an extension direction of the first extension 342 and in frictional contact with the first outer surface 3241 of the hinge protrusion 324, and the second elastic portion 345 may include a second protruding portion 3451 protruding in a direction intersecting with an extension direction of the second extension 343 and in frictional contact with the second outer surface 3242 of the hinge protrusion 324.

In an embodiment, the first extension 342 and the second extension 343 may be parallel to each other.

In an embodiment, the first elastic portion 344 and the first outer surface 3241 may be in direct contact with each other, and the second elastic portion 345 and the second outer surface 3242 may be in direct contact with each other.

In an embodiment, the second housing 320 may further include: a hinge engaging portion 322 in which the hinge protrusion 324 is formed, the hinge engaging portion 322 positioned on the outer edge 3211b of the cover 321; and a hinge shaft 323 rotatably connected to the support body 330.

In an embodiment, the first elastic portion 344 and the second elastic portion 345 may include guide portions 3442 and 3452 for guiding at least a portion of the hinge engaging portion 322, respectively.

In an embodiment, the guide portion 3442, 3452 may include a curved surface having a profile corresponding to a rotation trajectory of the second housing 320 about the hinge shaft 323.

In an embodiment, the first elastic portion 344 and the second elastic portion 345 may be coupled with the hinge protrusion 324 by interference fit.

In an embodiment, the first elastic portion 444 may include a first friction protrusion 4443 formed on a first contact surface 4442 that is in contact with the first outer surface 4241 of the hinge protrusion 424, and the second elastic portion 445 may include a second friction protrusion 4453 formed on a second contact surface 4452 that is in contact with the second outer surface 4242 of the hinge protrusion 424.

In an embodiment, the hinge protrusion 424 may include: a first boss 4241a protruding from the first outer surface 4241 and enclosing at least a portion of the first protruding portion 4441; and a second boss 4242a protruding from the second outer surface 4242 and enclosing at least a portion of the second protruding portion 4451.

In an embodiment, the electronic device 301 may further include an elastic support 570 coupled to the support body 530 and the hinge structure 540 to elastically support the hinge structure 540.

In an embodiment, the elastic support 570 may include: a fixing plate 571 fixed to the hinge fixing portion 541; a first extension plate 572 connected to the fixing plate 571 and extending along the first extension 542 to elastically support the first extension 542; and a second extension plate 573 connected to the fixing plate 571 and extending along the second extension 543 to elastically support the second extension 543.

In an embodiment, the electronic device may further include a support body 630 integrally formed with the hinge structure and positioned between the first housing and the second housing. The support body 630 may include a rim 631 including an inner edge 631a and an outer edge 631b, the first elastic portion 644 and the second elastic portion 645 being connected to the outer edge 631b, and the rim 631 may include a relief groove 635 extending toward the outer edge 631b.

An electronic device 701 according to an embodiment may include: a first housing 710; a second housing 720 including a cover 721 facing the first housing 710 and a hinge protrusion 724 formed in the cover 721; a support body 730 positioned between the first housing 710 and the second housing 720 and including a first hinge slide 734; and a hinge structure 740 configured to rotate the second housing 720 with respect to the first housing 710 along the hinge slide 734 and configured to stop the second housing 720 with respect to the first housing 710 at a predetermined position on the first hinge slide 734, and the hinge structure 740 may include: an elastic body 741 positioned on the first hinge slide 734 and configured to elastically deform; and a second hinge slide 742 positioned on the elastic body 741, in frictional contact with the hinge protrusion 724, and pressed by the hinge protrusion 724.

In an embodiment, the second hinge slide 742 may include: a first coupling portion 7421 passing through a first side 7411 of the elastic body 741 and coupled to a first portion 7342 of the first hinge slide 734; a second coupling portion 7422 passing through a second side 7412 of the elastic body 741 and coupled to a second portion 7343 of the first hinge slide 734; and a guide portion 7423 connected to the first coupling portion 7421 and the second coupling portion 7422 and configured to guide the hinge protrusion 724.

In an embodiment, the second hinge slide 742 may be formed of metal.

In an embodiment, the second hinge slide 842 may include at least one recess 8421 configured to define a rotation position of the second housing 820 and fit in the hinge protrusion 824.

In an embodiment, the second hinge slide 742 may have a rough surface configured to apply a weight to the rotation of the second housing 720.

What is claimed is:

1. An electronic device comprising:
   a first housing;
   a second housing comprising a cover facing the first housing, the cover comprising a hinge engaging portion, the hinge engaging portion comprising a hinge protrusion; and
   a hinge structure hingedly coupling the first housing and the second housing, the second housing being rotatable relative to the first housing, the second housing being transitionable between a closing position and an opening position, the closing position at which the first housing and the second housing define a first angle, the opening position being at which the first housing and the second housing define a second angle, an intermediate position at which the first housing and the second housing define a third angle that is between the first angle and the second angle;
   the hinge structure comprises a first base and a second base, the first base facing the hinge engaging portion and the second base connected to the first base, the second base comprising:
   a first contact surface configured to contact the hinge protrusion while the second housing is transitioning between the closing position and the intermediate position; and
   a second contact surface configured to contact the hinge protrusion while the second housing is transitioning between the intermediate position and the opening position.

2. The electronic device of claim 1, wherein the first contact surface varies between a first height with respect to a rotation reference plane and a second height, which is different from the first height, with respect to the rotation reference plane, and the rotation reference plane is defined as an imaginary plane comprising a first centerline of the first housing and a second centerline of the second housing.

3. The electronic device of claim 2, wherein the first height is at the closing position, the second height is at the intermediate position, and the second height is greater than the first height.

4. The electronic device of claim 3, wherein a pressure exerted by the hinge protrusion against the first contact surface increases while the second housing is transitioning from the closing position toward the intermediate position.

5. The electronic device of claim 1, wherein the second contact surface varies between a third height with respect to a rotation reference plane and a fourth height, the fourth height being different from the third height, with respect to the rotation reference plane, and the rotation reference plane is defined as an imaginary plane comprising a first centerline of the first housing and a second centerline of the second housing.

6. The electronic device of claim 5, wherein the third height is at the intermediate position, the fourth height is a height at the opening position, and the fourth height is less than the third height.

7. The electronic device of claim 6, wherein a pressure exerted by the hinge protrusion against the second contact surface decreases while the second housing is transitioning from the intermediate position toward the opening position.

8. The electronic device of claim 6, wherein the second contact surface is configured to suppress or delay the hinge protrusion from entering the first contact surface when the second housing transitions from the opening position toward the closing position.

9. The electronic device of claim 1, wherein the hinge structure further comprises a third contact surface supporting the hinge protrusion at the opening position.

10. The electronic device of claim 9, wherein the third contact surface is constant in height with respect to the rotation reference plane, and the rotation reference plane is defined as an imaginary plane comprising a first centerline of the first housing and a second centerline of the second housing.

11. An electronic device comprising:
a first housing;
a second housing comprising a cover facing the first housing, a hinge engaging portion formed in the cover, and a pair of hinge protrusions formed in the hinge engaging portion; and
a hinge structure positioned between the first housing and the second housing such that the first housing is rotatatable relative to the second housing such that during rotation of the first housing relative to the second housing, the second housing passes through an intermediate position at which the first housing and the second housing define a third angle between a first angle and a second angle, between a closing position at which the first housing and the second housing define the first angle and an opening position at which the first housing and the second housing define the second angle;
the hinge structure comprising a first base facing the hinge engaging portion and a pair of second bases connected to the first base, the pair of second bases each comprising:
a first contact surface configured to contact the hinge protrusion while the second housing is transitioning between the closing position and the intermediate position; and
a second contact surface configured to contact the hinge protrusion while the second housing is transitioning between the intermediate position and the opening position.

12. The electronic device of claim 11, wherein the first contact surface varies between a first height with respect to a rotation reference plane and a second height, which is different from the first height, with respect to the rotation reference plane, and the rotation reference plane is defined as an imaginary plane comprising a first centerline of the first housing and a second centerline of the second housing.

13. The electronic device of claim 12, wherein the first height is at the closing position, the second height is at the intermediate position, and the second height is greater than the first height.

14. The electronic device of claim 13, wherein pressures exerted by the pair of hinge protrusions against the respective first contact surfaces increase while the second housing is transitioning from the closing position toward the intermediate position.

15. The electronic device of claim 11, wherein the second contact surface varies between a third height with respect to a rotation reference plane and a fourth height, which is different from the third height, with respect to the rotation reference plane, and the rotation reference plane is defined as an imaginary plane comprising a first centerline of the first housing and a second centerline of the second housing.

16. The electronic device of claim 15, wherein the third height is at the intermediate position, the fourth height is at the opening position, and the fourth height is less than the third height.

17. The electronic device of claim 16, wherein pressures exerted by the pair of hinge protrusions against the respective second contact surfaces decrease while the second housing transitions from the intermediate position toward the opening position.

18. The electronic device of claim 16, wherein the second contact surface is configured to suppress or delay the pair of hinge protrusions from entering the respective first contact surfaces, when the second housing transitions from the opening position toward the closing position.

19. The electronic device of claim 11, wherein the pair of second bases each further comprise a third contact surface supporting the pair of hinge protrusions at the opening position.

20. An electronic device comprising:
a first housing comprising an outer case and a front case positioned in at least a portion of the outer case and having at least one cavity for receiving at least one wearable device;
a second housing comprising a cover configured to face the outer case, a hinge engaging portion formed in the cover, and a hinge protrusion formed in the hinge engaging portion; and
a hinge structure positioned between the first housing and the second housing such that the second housing is rotatable with respect to the first housing, such that during rotation of the first housing relative to the second housing, the second housing passes through an intermediate position at which the first housing and the second housing define a third angle between a first angle and a second angle, between a closing position at which the first housing and the second housing define the first angle and an opening position at which the first housing and the second housing define the second angle;
the hinge structure comprising a first base facing the hinge engaging portion and a second base connected to the first base, the second base comprising:
a first contact surface contacting the hinge protrusion while the second housing is transitioning between the closing position and the intermediate position; and
a second contact surface contacting the hinge protrusion while the second housing is transitioning between the intermediate position and the opening position.

* * * * *